(12) United States Patent
Shaheen

(10) Patent No.: US 11,102,807 B2
(45) Date of Patent: Aug. 24, 2021

(54) SYSTEMS AND METHODS FOR SUPPORTING URLLC SERVICE IN 5G NR

(71) Applicants: Sharp Laboratories of America, Inc., Vancouver, WA (US); FG Innovation Company Limited, Hong Kong (CN)

(72) Inventor: Kamel M. Shaheen, Camas, WA (US)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 0 days.

(21) Appl. No.: 15/953,086

(22) Filed: Apr. 13, 2018

(65) Prior Publication Data

US 2018/0302918 A1   Oct. 18, 2018

Related U.S. Application Data

(63) Continuation of application No. PCT/US2018/027379, filed on Apr. 12, 2018.

(60) Provisional application No. 62/485,568, filed on Apr. 14, 2017.

(51) Int. Cl.

| H04W 72/14 | (2009.01) |
|---|---|
| H04W 76/27 | (2018.01) |
| H04W 28/02 | (2009.01) |
| H04W 72/12 | (2009.01) |
| H04W 28/20 | (2009.01) |

(52) U.S. Cl.
CPC ....... *H04W 72/14* (2013.01); *H04W 28/0278* (2013.01); *H04W 72/1284* (2013.01); *H04W 76/27* (2018.02); *H04W 28/20* (2013.01)

(58) Field of Classification Search
CPC ............ H04W 76/27; H04W 72/1284; H04W 28/0278; H04W 72/0413; H04W 72/14; H04W 72/10
See application file for complete search history.

(56) References Cited

U.S. PATENT DOCUMENTS

| 2011/0080892 A1* | 4/2011 | Cai ................... H04W 36/0033 370/331 |
| 2015/0049606 A1* | 2/2015 | So ......................... H04L 47/808 370/230 |
| 2015/0173099 A1* | 6/2015 | Sun ....................... H04W 72/10 370/336 |
| 2018/0007567 A1* | 1/2018 | Koskinen .............. H04L 5/0055 |

(Continued)

OTHER PUBLICATIONS

U.S. Appl. No. 16/087,876,Certified_Copy_of_Foreign_Priority_Application,filed Sep. 24, 2018 (Year: 2016).*

(Continued)

*Primary Examiner* — Ernest G Tacsik

(74) *Attorney, Agent, or Firm* — Austin Rapp

(57) ABSTRACT

A 5G new radio (NR) Base Station (gNB) is described. The gNB includes a processor and memory in electronic communication with the processor. Instructions stored in the memory are executable to receive one or more indications for data availability generated by an ultra-reliable low-latency communication (URLLC)-based logical channel group (LCG) in a 5G NR buffer status report (BSR), a specific numerology-based LCG in a 5G NR BSR, or a URLLC operating in a specific numerology using a 5G NR BSR.

18 Claims, 18 Drawing Sheets

1700

Receive one or more indications for data availability generated by: an ultra-reliable low-latency communication (URLLC)-based logical channel group (LCG) in a 5G NR buffer status report (BSR), a specific numerology-based LCG in a 5G NR BSR, or a URLLC operating in a specific numerology using a 5G NR BSR ⸺ 1702

(56) References Cited

U.S. PATENT DOCUMENTS

| | | | | |
|---|---|---|---|---|
| 2018/0027443 | A1* | 1/2018 | Lee | H04W 72/1284 370/329 |
| 2018/0049064 | A1* | 2/2018 | Li | H04W 28/0289 |
| 2018/0077721 | A1* | 3/2018 | Nory | H04W 72/14 |
| 2018/0139020 | A1* | 5/2018 | Takeda | H04W 72/04 |
| 2018/0249513 | A1* | 8/2018 | Chang | H04B 7/26 |
| 2019/0110224 | A1* | 4/2019 | Yasukawa | H04W 72/14 |
| 2019/0132766 | A1* | 5/2019 | Yl | H04W 88/06 |
| 2019/0246414 | A1* | 8/2019 | Yang | H04W 72/0486 |

OTHER PUBLICATIONS

Ericsson, "Uplink dynamic scheduling in NR", 3GPP TSG-RAN WG2 #97, Athens, Greece, Tdoc R2-1700838, Feb. 17, 2017.
Intel Corporation, "Enhancements of SR/BSR in NR", 3GPP TSG RAN WG2 Meeting #97, Athens, Greece, R2-1701723, Feb. 17, 2017.
Ericsson, "Summary of RAN2 solutions for URLLC", 3GPP TSG RAN WG2 Meeting #97, Athens, Greece, Tdoc R2-1700905, Feb. 17, 2017.
3GPP TS 36300 V13.4.0, Evolved Universal Terrestrial Radio Access (E-UTRA) and Evolved Universal Terrestrial Radio Access Network (E-UTRAN); Overall description; Stage 2, (Release 13) Jun. 2016.
3GPP TS 36321, V14.1.0, Evolved Universal Terrestrial Radio Access (E-UTRA); Medium Access Control (MAC); Protocol specification (Release 14) Dec. 2016.
3GPP TS 36331, V14.1.0, Evolved Universal Terrestrial Radio Access (E-UTRA); Radio Resource Control (RRC); Protocol specification (Release 14) Dec. 2016.
3GPP TS 36304, V14.0.0, Evolved Universal Terrestrial Radio Access (E-UTRA); User Equipment (UE) procedures in idle mode (Release 14) Sep. 2016.
Intel Corporation, "Enhancements of SR/BSR in NR", 3GPP TSG RAN WG2 Meeting #97bis, Spokane, US, R2-1703422, Apr. 7, 2017.
Qualcomm Incorporated, "Enhanced SR and BSR", 3GPP TSG-RAN WG2 Meeting #97bis, Spokane, USA, R2-1703887 (updated version of R2-1703671), Apr. 7, 2017.
ETRI, "Uplink scheduling for multipl numerologies", 3GPP TSG-RAN WG2 Meeting #97bis, Spokane, USA, R2-1703152, Apr. 7, 2017.
International Search Report and Written Opinion issued for PCT Application No. PCT/US2018/027379 dated Jun. 28, 2018.
Qualcomm Incorporated, "URLLC numerology and frame structure design", 3GPP TSG-RAN WG1 #86, Gothenburg, Sweden, R1-166360, Aug. 26, 2016.
Qualcomm Incorporated, "NR numerology design and evaluation for long delay spread channels", 3GPP TSG-RAN WG1 #85, Nanjing, Chain, R1-164691, May 27, 2016.
Qualcomm Incorporated, "Numerology and TTI multiplexing for NR Forward Compatibility Analysis", 3GPP TSG-RAN WG1 #85, Nanjing, Chain, R1-164692, May 27, 2016.
3GPP TR 38.912 V1.0.0, "Technical Specification Group Radio Access Network; Study on New Radio (NR) Access Technology (Release 14)", Mar. 2017.

\* cited by examiner

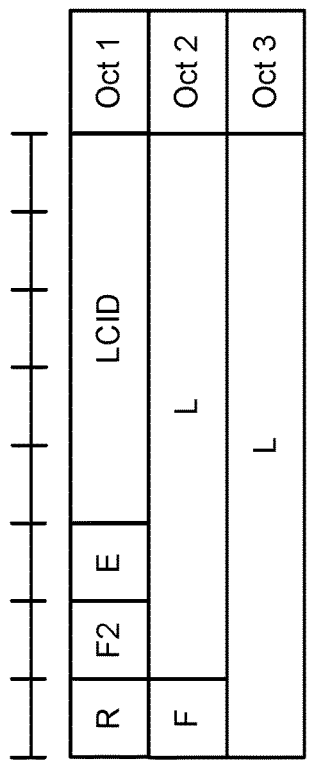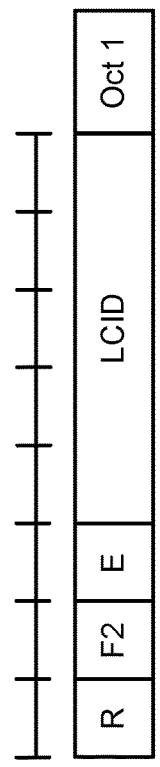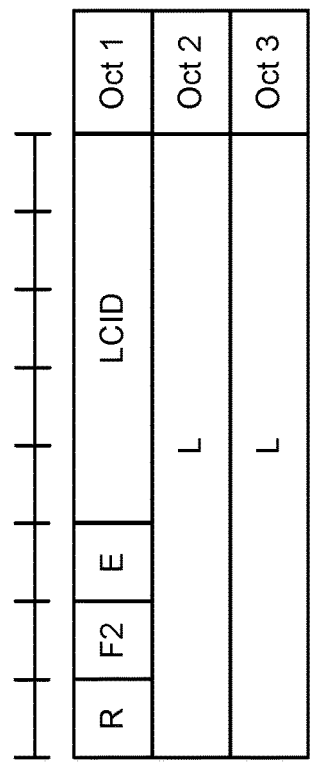
FIG. 5

SYSTEMS AND METHODS FOR SUPPORTING URLLC SERVICE IN 5G NR

RELATED APPLICATIONS

This application is related to and claims priority from U.S. Provisional Patent Application No. 62/485,568, entitled "SYSTEMS AND METHODS FOR SUPPORTING URLLC SERVICE IN 5G NR," filed on Apr. 14, 2017, which is hereby incorporated by reference herein, in its entirety.

TECHNICAL FIELD

The present disclosure relates generally to communication systems. More specifically, the present disclosure relates to systems and methods for supporting ultra-reliable low-latency communication (URLLC) service and associated numerologies in fifth generation (5G) New Radio (NR).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 5 illustrates examples of MAC PDU subheaders;

DETAILED DESCRIPTION

Figure 1:
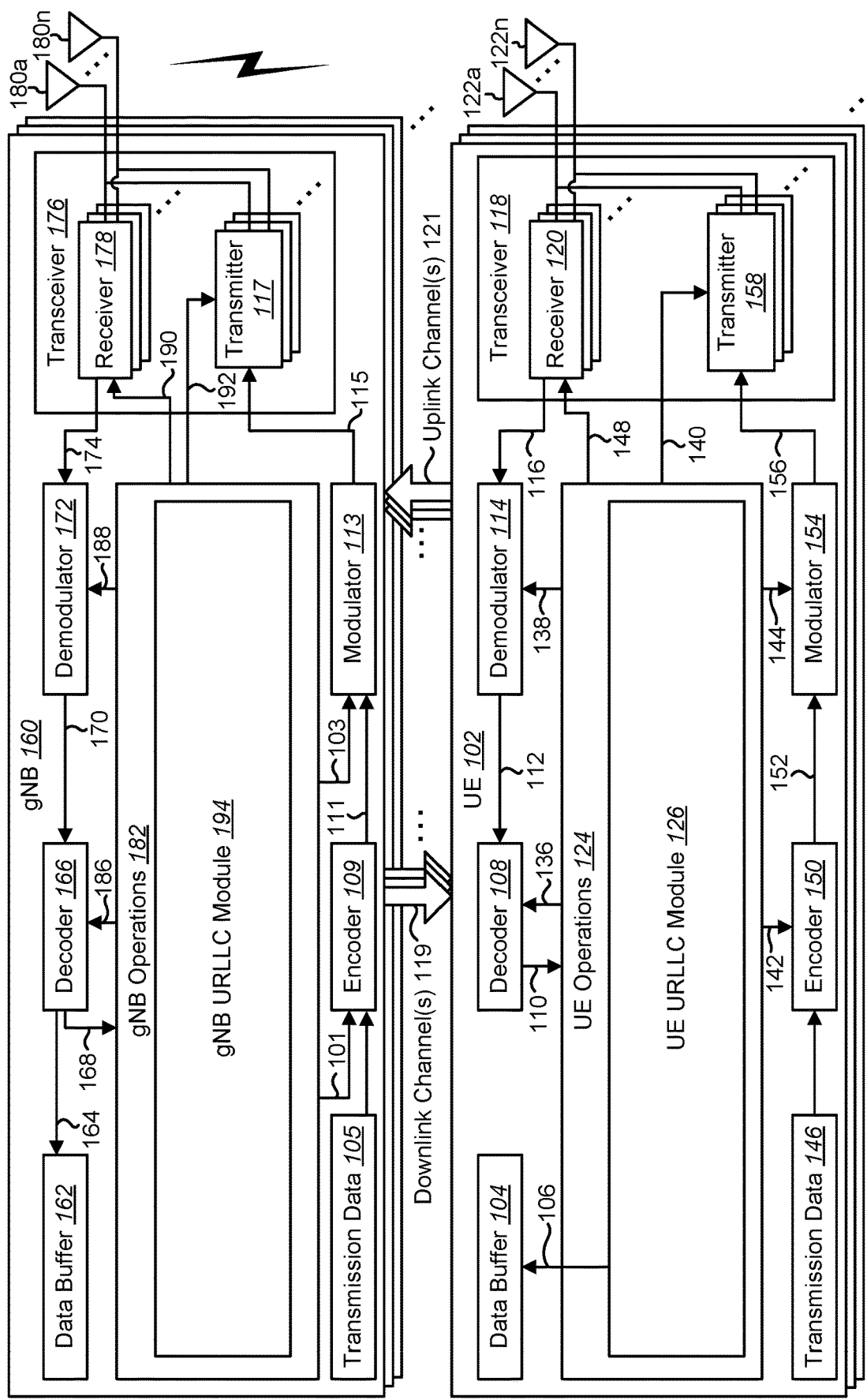
FIG. 1 is a block diagram illustrating one implementation of one or more base stations (gNBs) and one or more user equipments (UEs) in which systems and methods for supporting ultra-reliable low-latency communication (URLLC) service and associated numerologies in fifth generation (5G) New Radio (NR) may be implemented.

A 5G new radio (NR) Base Station (gNB) is described. The gNB includes a processor and memory in electronic communication with the processor. Instructions stored in the memory are executable to receive one or more indications for data availability generated by an ultra-reliable low-latency communication (URLLC)-based logical channel group (LCG) in a 5G NR buffer status report (BSR), a specific numerology-based LCG in a 5G NR BSR, or a URLLC operating in a specific numerology using a 5G NR BSR.

The gNB may also process a bandwidth request on highest priority. The gNB may allocate enough bandwidth for the bandwidth request. The gNB may pre-empt any services grants if necessary.

A URLLC flag may be included in a medium access control (MAC) Control Element (CE) using Logical Channel Groups at the beginning or end of the MAC CE to achieve backward compatibility. A URLLC flag may be received in a new MAC Control Element with new logical channel IDs at the beginning or end of the frame.

A URLLC flag may be included in a logical channel configuration information element to indicate attributes of URLLC services. The URLLC flag may be included in the logical channel configuration information element when performing an RRCConnectionRequest message or procedure. The URLLC flag may be included in the logical channel configuration information element when performing an RRCConnectionResumeRequest message or procedure. The URLLC flag may be included in the logical channel configuration information element when performing an RRCConnectionReconfiguration message or procedure. The URLLC flag may be included in the logical channel configuration information element when performing an RRCConnectionReestablishmentRequest message or procedure.

A 5G new radio (NR) user equipment (UE) is described. The UE includes a processor and memory in electronic communication with the processor. Instructions stored in the memory are executable to use a bitmap to indicate high priority logical channel groups (LCGs). The instructions are also executable to send one or more indications for data availability generated by an ultra-reliable low-latency communication (URLLC)-based logical channel group (LCG) in a 5G NR buffer status report (BSR), a specific numerology-based LCG in a 5G NR BSR, or a URLLC operating in a specific numerology using a 5G NR BSR.

The UE may receive a grant for the URLLC. The UE may send URLLC data from an LCG according to its priority.

The bitmap may be included in a BSR medium access control (MAC) Control Element (CE) to indicate Logical Channel Groups. The bitmap based flag may be sent in a new NR BSR MAC Control Element as logical channel group IDs.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a gNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB or gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio", "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (mMTC) like services. In order for the services to use the time/frequency/space medium efficiently it would be useful to be able to flexibly schedule services on the medium so that the medium may be used as effectively as possible, given the conflicting needs of URLLC, eMBB, and mMTC. An NR base station may be referred to as a gNB. A gNB may also be more generally referred to as a base station device.

The systems and methods described herein provide a mechanism to indicate activities of URLLC services in an LTE-based Buffer Status Request (BSR) to facilitate the granting and allocation of higher priority bandwidth to a 5G NR UE. URLLC provides a paradigm shift and enhanced way of communication with extreme requirements including 1 millisecond (ms) end-to-end radio frequency (RF) latency and guaranteed minimum reliability of 99.999%, which are crucial for some URLLC use cases (e.g., Tele-diagnosis, tele-surgery and tele-rehabilitation).

In an implementation, a flag may be included in the MAC Control Element containing the 5G NR BSR to indicate to the gNB that URLLC is included in the bandwidth (BW) request. A flag may indicate the attributes of the URLLC service(s) being sought in establishing a new Data Radio Bearer (DRB) during different RRC Connection Establishment Procedures. In an implementation, the flag may be added to a LogicalChannelConfig information element (IE).

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for supporting ultra-reliable low-latency communication (URLLC) service and associated numerologies in fifth generation (5G) New Radio (NR) may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (Physical Uplink Shared Channel)), and/or a physical control channel (e.g., PUCCH (Physical Uplink Control Channel)), etc. The one or more gNBs 160 may also transmit information or data to the one or more UEs 102 using one or more downlink channels 119, for instance. Examples of downlink channels 119 physical shared channel (e.g., PDSCH (Physical Downlink Shared Channel), and/or a physical control channel (PDCCH (Physical Downlink Control Channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE URLLC module 126.

In LTE the function of the Scheduling Request (SR) is for the UE 102 to indicate that it needs an uplink grant because it has data to transmit but no uplink grant. The SR may be a single bit indication triggered in the medium access control (MAC) and transmitted on PUCCH. The UE 102 may be configured with an SR configuration to transmit the SR. If the UE 102 has no UL resources allocated to it in which it could send an SR, the UE 102 may in turn send the SR using a random access procedure.

With regard to NR, some considerations with SR include traffic characteristics, logical channel/logical channel group, the amount of data available, information related to numerology and/or Transmission Time Interval (TTI) duration, and the priority of data.

In LTE, the periodicity of the SR periodicity can be {1, 2, 5, 10, 20, 40, 80} ms. After the transmission of the SR, the UE 102 may monitor the PDCCH and upon reception of an UL grant, the UL-SCH transmission may follow 4 subframes later. The SR periodicity is a main contributor to the overall latency from data arrival to the UL-SCH transmission, unless it is kept very short. There is a trade-off between SR periodicities and the capacity. With a short SR periodicity in the system, fewer UEs 102 can be configured with SR compared to longer SR periodicities, which allows more UEs 102 to be configured with SR.

Short latency in NR may be important to support services like URLLC. This may impact the design of the SR. The design of the SR in a multi-numerology/TTI duration configuration also influences the latency. With regard to NR, some considerations for SR latency and periodicity include: major design changes related to SR latency and periodicity compared to LTE; what is the impact from the NR latency requirements; what is the impact from a multiple numerology/TTI duration configuration; and what is the impact from other functions designed to reduce latency (e.g., grant-free transmissions and Semi-Persistent Scheduling (SPS)).

The function of the Buffer Status Report (BSR) in LTE is for the UE 102 to report the amount of available data in the UE 102 to the eNB. The eNB can then use this information to set the size of the UL grant. Logical channels are grouped together in logical channel groups (LCGs). A BSR is triggered if data becomes available in an LCG and all other LCGs have no data, or if data belonging to a logical channel with a higher priority than all other LCGs becomes available, or if there is room in the MAC Protocol Data Unit (PDU) to send a BSR instead of padding. There may be two timers which upon expiry trigger BSR. A BSR contains information on the amount of data available per logical channel group. The BSR is carried as a MAC control element (CE) in a MAC PDU.

Like the SR, the design of the BSR for NR may be impacted by the multi-numerology/TTI duration configuration supported in NR. The systems and methods described herein provide mechanisms for BSR for NR.

Uplink scheduling is a key functionality to meet a broad range of use cases including enhanced mobile broadband, massive MTC, critical MTC, and additional requirements. In LTE, scheduling requests (SRs) are used for requesting UL-SCH resources for new transmissions when the UE 102 has no valid grant. If SRs are not configured for the UE 102, the UE 102 may initiate a Random Access procedure to get scheduled in UL.

In LTE, SRs include only one bit of information and indicate only that the UE 102 needs an UL grant. This means that upon the reception of SR, the gNB 160 knows neither which logical channel (associated with certain Quality of Service (QoS) Class Identifier (QCI)) has data available for transmission, or the amount of data available for transmission at the UE 102. Furthermore, it should be noted that the numerology/TTI duration should be conveyed in the grant. This implies that the gNB 160 may also be made aware of what numerology/TTI duration is desired by the UE 102 for the upcoming transmission. In short, in NR an accurate grant cannot be provided to the UE 102 only based on the one-bit information of the LTE type of SR. It should be noted that LTE scheduling request saves physical layer resources but does not provide sufficient information for efficient grant allocation in NR.

Buffer Status Reports (BSRs) on the other hand carry more detailed information compared to SR. A BSR indicates buffer size for each LCG. However, the BSR requires a grant for transmission so it may take a longer time until the gNB 160 receives it since it may need to be preceded by an SR. The interaction between SR, BSR and grant is exemplified in FIG. 2.

The framework with SR/BSR from LTE may be improved. In an approach, the SR/BSR scheme from LTE can be reused in NR as a baseline. NR should support a wide spread of use cases which have different requirements. In some use cases (e.g., critical MTC and URLLC), NR has tighter latency requirements than has been considered for LTE so far. Also, services such as eMBB can enjoy the enhancements to SR and BSR.

In NR, modifications of SR/BSR aim to report the UE buffer status (e.g., priority and the buffer size) as well as wanted numerology/TTI duration within the given time constraints. It is assumed that a mapping of logical channel (LCH) to LCG to numerology/TTI duration will make it possible to infer which numerology/TTI duration to use given the LCG. Hence no explicit signaling of numerology/TTI duration is needed in the SR/BSR if an LCG (or LCH) is present in the SR/BSR. Considering the limitations identified above, it is possible to either enhance SR with more information bits to indicate more information or enhance BSR.

A possible improvement is to extend the SR to not only indicate whether data is available or not. With more bits used in SR it would be possible to provide more detailed information such as the type of LCG that has data available, and/or the amount of available data associated with the LCG. By knowing the type of LCG, a gNB 160 can provide grants for the traffic that needs to be scheduled. This enables a more correct priority handling. By indicating the amount of available data associated with the LCG that needs a grant at the UE 102, the gNB 160 can provide a more suitable grant size on the preferred numerology/TTI duration, for instance, to the UE 102.

Since the numerology/TTI duration can be derived from the LCG, situations where the UE 102 has data for transmission on, for example, a short TTI, but receives a grant on a long TTI can be avoided. How many bits that SR should be extended with is a question of how to achieve a good trade-off between the increased L1 control channel issues (e.g., overhead, design complexity, etc.) and the achieved gain in terms of UP latency reduction. Therefore, more efficient priority handling may be achieved by extending additional bits for SR.

The BSR may also be enhanced. With regard to grant-free transmission for BSR, to avoid the delay caused by BSR grant allocation, grant-free transmission of BSR without sending an SR may be supported. This may be a viable opportunity at low and medium load and in cells serving relatively few (active) UEs 102.

Similar grant-free mechanisms are also expected to be introduced that may delay critical use cases such as URLLC. For fast BSR reporting purposes, a dedicated resource allocation per UE 102 may be used. If grant-free transmissions are supported, it would be efficient to send BSR per logical channel group (also referred to as short BSR in LTE). In this way, only the BSR intended for high priority of traffic can be allowed to use the grant-free channel. For efficiency reasons, the grant-free resources assigned per UE 102 may be large enough to fit just the BSR. The grant-free resources should also be possible to be utilized by data transfer, if there is no BSR pending for transmission. Therefore, grant allocation delay for BSR can be reduced with grant-free transmission of BSRs.

Improved BSR triggering is also described. In LTE, some of the existing rules for BSR triggering may be too strict. For instance, the UE 102 may be allowed to transmit a BSR when there is new data available in the buffer with higher priority than the existing data, while the UE 102 is not allowed to send a BSR if the new data has the same or lower priority than the existing data. This may lead to information mismatch between the UE 102 and gNB 160, resulting in a long unnecessary scheduling delay until the UE 102 can empty its transmission buffer. In this case, a simple solution is to remove the above restriction (i.e., let the UE 102 send the BSR when there is new data regardless of its priority). The network can configure this feature considering the balance between increased BSR reporting overhead and the need for accurate buffer information estimation. Therefore, the scheduling delay may be reduced by allowing a UE 102 to send BSR upon the arrival of new data regardless of the priority of its associated logical channel.

Just as in the case of SR, the gNB 160 needs to be made aware of what numerology/TTI duration that is preferred or what data is wanted. Since it may be assumed that a mapping of LCH to LCG to numerology/TTI duration will make it possible to infer which numerology/TTI duration to use given the LCG indicated in the BSR, no additional information is needed in the BSR.

SR enhancements give fast reporting without grant allocation at Layer 2. However, it would incur a higher control channel overhead, and higher design complexity. It is also more difficult to ensure the transmission reliability given that more information bits are carried. BSR enhancements potentially achieve the same performance as SR enhancements in terms of reduction of UP latency. While it requires network to assign dedicated resources to each UE 102, it might have a risk of resource over-provision in a case where there are a massive amount of connected UEs 102.

In some cases, if SR enhancements are adopted, BSR enhancements may not be needed and vice versa. Therefore, it is meaningful to further compare different enhancements.

In order to utilize the SCH resources efficiently, a scheduling function is used in MAC. An overview of the scheduler is given in terms of scheduler operation, signaling of scheduler decisions, and measurements to support scheduler operation. The MAC in an NR gNB 160 may include dynamic resource schedulers that allocate physical layer resources for the Downlink Shared Channel (DL-SCH), Uplink Shared Channel (UL-SCH) transport channels. Different schedulers operate for the DL-SCH and the UL-SCH.

The scheduler should take account of the traffic volume and the QoS requirements of each UE 102 and associated radio bearers when sharing resources between UEs 102. Only "per UE" grants may be used to grant the right to transmit on the UL-SCH. Since a logical channel can be mapped to one or more numerologies/TTI durations, the grant may be limited to certain logical channels mapped with certain numerologies, so, only those logical channels are allowed to transmit upon reception of this grant. Schedulers may assign resources taking into account the radio conditions at the UE 102 identified through measurements made at the gNB 160 and/or reported by the UE 102.

In the uplink, an NR gNB 160 may dynamically allocate resources (e.g., Physical Resource Blocks (PRBs) and MCS) to UEs 102 at each TTI via the Cell Radio Network Temporary Identifier (C-RNTI) on PDCCH(s). Within each scheduling epoch, the scheduling entity may assign a grant associated with a set of numerologies/TTI durations for each schedulable UE 102.

Measurement reports are required to enable the scheduler to operate in both uplink and downlink. These include transport volume and measurements of a UE's radio environment. Uplink buffer status reports (BSR) and scheduling request (SR) are needed to provide support for QoS-aware packet scheduling.

The scheduling request (SR) as a layer one signaling message may be used for requesting UL resources for new transmissions when the UE 102 has no valid grant. An SR can be transmitted via either a PUCCH like channel in a case where the UE 102 has dedicated resources assigned for it, or a Random Access procedure in a case where the UE 102 has no dedicated resources assigned for it or the UE 102 is out of synchronization from the network.

Uplink buffer status reports (BSR) refer to the data that is buffered in for a group of logical channel (LCG) in the UE 102. Uplink buffer status reports are transmitted using MAC signaling. Prior to a BSR transmission, the UE 102 is required to have a valid grant. The scheduling entity needs to be aware information including: an indication that a UE 102 has data to transmit; buffer size for each logical channel (group); priority indication for each logical channel (group); and/or an indication of a set of the associated numerologies/TTI durations for each logical channel (group). For each UE 102, the above information may be reported by a SR or a BSR.

As described above, in LTE, UL scheduling is mainly based on the scheduling request (SR) and buffer status report (BSR) received from UEs 102. The SR is an indication to the eNB to provide a UL grant for transmitting the BSR and contains no information of the amount of data. The information of the amount of data for each of the logical channel group (LCG) may be provided in the BSR.

In NR, UL scheduling based on SR/BSR can be used for eMBB. For URLLC, other than the grant-less transmission, UL scheduling based on SR/BSR may also be implemented. In LTE, when a scheduling request (SR) is triggered, the UE 102 indicates to the eNB that it has data to transmit in the buffer. The eNB provides a default UL grant which is used by the UE 102 to transmit the data and/or BSR. It may be the case that the provided grant is enough to transmit all data. However, it is also likely that the grant is not enough and the UE 102 has to request another grant using BSR. The consequence of this process is additional delay for the case when the UE 102 would have been able to transmit all data, had the first UL grant been little bit larger. Also, there is no indication of the priority of the SR. Allowing the gNB 160 to know the priority of the SR would help the gNB 160 scheduler prioritize the UL resources among the UEs 102.

In LTE, the eNB has no information whether the UE 102 has a large or small amount of data and also whether the UE 102 has high priority data until the eNB receives a BSR. For delay-sensitive use cases, it can be beneficial if the SR is enhanced to piggyback more information about the characteristic of data being queued at the UE buffer. It is because the UE 102 may be able to transmit all the data in the first UL grant it receives without waiting for the next UL grant received based on a BSR.

NR has to support variety of services. Other than eMBB services, NR also supports URLLC services which require ultra-low latency. Even within eMBB services, there are services that are more delay-stringent than others and may have a higher priority. There may also be Radio Resource Control (RRC)/Non-Access Stratum (NAS) signaling requiring higher priority than normal data transmission from other UEs 102. Hence, it may be beneficial for the gNB scheduler to know the priority of the SR to allow the gNB 160 to prioritize the UL resources among the UEs 102.

In order for the eNB scheduler to schedule the UL resources directly from the received SR, it needs to know the characteristics of the UL data which is contained in the LCG. Hence, it is beneficial for the gNB scheduler to know the LCG associated with UL data. SR with more information on traffic characteristic/services may be beneficial for better UL scheduling at the network. However, in today's LTE SR format, no extra information bits are present apart from presence or absence of SR.

In LTE, there are two types of BSR formats that can be reported to the eNB. The first one is the short/truncated BSR format where buffer status of one logical channel group can be reported. The second one is the long BSR format where data from all logical channel groups are reported. In LTE, there are four LCGs. In NR, more LCGs may be defined to provide finer granularity of the data priorities depending on the number of logical channels or types of services to be supported.

A drawback of the current method is that it is not flexible to transmit the BSR corresponding to two to (max−1) LCGs. It is also not possible to identify the TTIs or service for which the BSR is being reported. Such identification may be helpful for better UL scheduling decision by the network.

Figure 3:
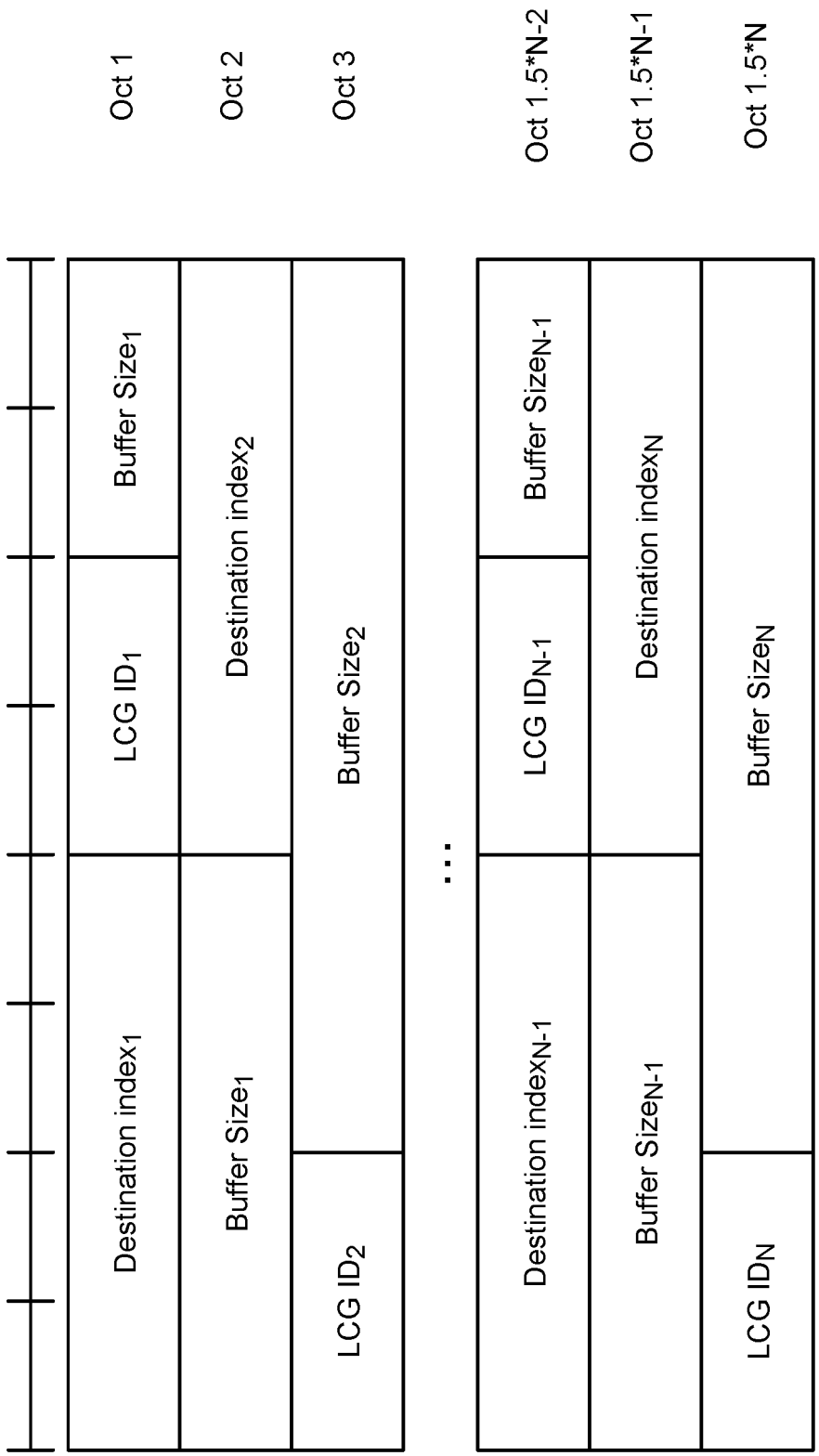
FIG. 3 is an example illustrating a sidelink Buffer Status Report (BSR) format in LTE.

In LTE sidelink operation, each sidelink logical channel group is defined per ProSe destination. A ProSe destination with the highest priority is selected for UL scheduling by the network. Therefore, the sidelink BSR format is different than that of LTE legacy BSR format as shown in FIG. 3.

In NR, it is also possible that more logical channel groups than that of LTE are defined for BSR to help the network better prioritize the user's data. This requires a change in MAC CE format of the BSR, which can be done efficiently if it is defined in terms of logical channel or logical channel groups.

In LTE, only four logical channel group (LCG) are defined to prioritize the data. In NR, for finer granularity of data priorities to reflect the various services and numerologies a UE is supporting, a larger number of LCGs could be necessary in NR. In this case, a new MAC CE for BSR needs to be designed to accommodate all data corresponding to a number of LCGs. The MAC CE could include one or more than one LCG IDs of the data.

Another option in enhancing the BSR could be reporting the BSR corresponding to each logical channel. In NR, it is likely that a logical channel may be associated with a TTI or a service in a UE 102. It could be possible that data in one logical channel may be more important or have higher priority than the data in other logical channel. This can be decided based on a mapping function between the logical channel and TTI duration or QoS flow profile. For this purpose, a new MAC CE can be defined to indicate the logical channel associated with the buffer index in the BSR.

URLLC will provide a paradigm shift and enhance the way of communication with extremely challenging requirements. This includes 1 ms end-to-end radio link latency and guaranteed minimum reliability of 99.999%, which are crucial for some URLLC use cases.

Some URLLC uses cases are described herein and how they map to requirements at a high level. A URLLC terminal (e.g., UE 102) will get a benefit from packet duplication. Radio Link Control (RLC) retransmission (ARQ) is not assumed to be used for meeting the strict user plane latency requirements of URLLC. A URLLC device MAC entity may be supported by more than one numerology/TTI durations.

The NR design aims to meet the URLLC QoS requirements only after the control plane signaling for session setup has completed (to eliminate the case that the UE 102 is initially in idle). Discontinuous reception (DRX) design will not optimize for URLLC service requirements.

For DL, dynamic resource sharing between URLLC and eMBB is supported by transmitting URLLC scheduled traffic. URLLC transmission may occur in resources scheduled for ongoing eMBB traffic. Asynchronous and adaptive HARQ is supported for URLLC DL.

At least an UL transmission scheme without grant is supported for URLLC. Resources may or may not be shared among one or more users.

In an implementation, mini-slots have the following lengths. At least above 6 GHz, mini-slot with length 1 symbol supported. Lengths from 2 to slot length −1 may be supported. It should be noted that some UEs 102 targeting certain use cases may not support all mini-slot lengths and all starting positions. Mini-slots can start at any OFDM symbol, at least above 6 GHz. A mini-slot may contain Demodulation RS(s) (DM-RS) at position(s) relative to the start of the mini-slot.

A wide range of URLLC use cases may be supported by NR. 5G aims to support a broad range of use cases (or services) and enable ground-breaking performance of the URLLC devices (e.g., robots, smart cars, etc.). Some URLLC applications are discussed herein.

One URLLC use case is robotics. 5G needs to improve the response time for diagnostic situations. For instance, in the near future, robots will be very low-cost, since robots will only carry around a set of sensors, cameras, actuators and mobility control units. All the intelligent computation system, requiring expensive hardware, may be remotely run on an edge cloud.

The sensors and cameras on the robots may be used to monitor the environment and capture the data in real time. The captured data will be immediately transmitted to a central system in a few milliseconds. The center processes the data in an intelligent way (e.g., based on machine learning and AI (artificial intelligent) algorithms) and makes decisions for the robots. The decision/commands may be delivered to the robot very quickly and the robots will follow the instructions.

The targeted maximum round trip time for this kind of robotic scenario is 1ms. This may include starting with capturing data, transmitting the data to the center, progressing data on the center and sending the command to the robot, and running the received command.

Another URLLC use case is industrial automation. Industrial automation (together with MTC) is one of the key applications that are considered within 5G systems. Current industrial control systems rely on fast and reliable wired links. However, there exists a large interest in utilizing flexible wireless systems provided by 5G in the future.

This use case considers a combined indoor factory environment, where a number of objects (e.g., robots, self-driving heavy machines, etc.) perform various dedicated tasks as parts of a production process. All these objects are controlled by a production center. These kinds of industrial applications require a guaranteed reliability, higher data rate and minimum end-to-end latency within various control processes.

Another URLLC use case is remote surgery and health care. Remote surgery can be considered as another 5G URLLC use case. With a sense of touch, 5G can enable a surgeon to diagnose (e.g., identify cancerous tissue) where the specialist and the patient physically are not able to be present in the same room/environment.

In this 5G medical use case, there may be a robotic end which in real time will provide the sense of touch to the surgeon during a minimally invasive surgery. The sense of touch will be captured at the robotic end and, with a latency of few milliseconds, the sensed data will be reflected to the surgeon who is at the other end and wears haptic gloves. On top of that, the surgeon needs to be able to remotely control the robotic end as well in a visualized environment. In the remote surgery scenario, the e2e latency is ideally in the order of several milliseconds.

Another URLLC use case is interactive augmented-virtual reality. A high-resolution augmented-virtual reality system is an efficient way to display a real or manipulated environment in three-dimensions for educational purposes, for instance. In one scenario, a number of trainees are connected in a virtualized real environment/system simulator, where the trainees are able to jointly/collaboratively interact with each other by perceiving the same environment and the same artificial subjects and objects. Since the scenario requires interaction between the trainees in real time, the targeted round-trip time from trainee to the simulator and from simulator back to the trainee should be in the order of milliseconds and not exceed human perception time.

Another URLLC use case is smart vehicles, transport and infrastructure. Self-Driving vehicles can be interpreted as automated driving where vehicle-to-infrastructure (e.g., smart bus stop, smart traffic lights, etc.) and vehicle-to-vehicle real-time communication is required. All these communications can be coordinated in real time by a centralized system (e.g., Intelligent Traffic Management Center (ITMC)).

In such a scenario, the ITMC aims to estimate hazardous conditions well in advance and decrease the risk of traffic accidents. As an example, as an intelligent system, the ITMC can monitor attributes of the objects in the traffic based on the object's received data. By doing that, fatal situations will be anticipated and the system will interact directly (e.g., steer vehicles) even before the drivers to prevent accidents. In this kind of traffic scenario, round-trip latencies from vehicles to ITMC and ITMC to the vehicles in the order of milliseconds will increase the traffic safety.

Another URLLC use case is drones and aircraft communication. Drones are getting increasingly important, especially in the surveillance, public safety and media domain.

All of these domains come under the critical communication with strict requirements on latency and reliability. The motivation for such requirements varies from mission criticality to monetary benefits (e.g., coverage of sports events using drones leading to in-demand content with high copyrights cost).

Latency and reliability are key factors to control the drones given the nature of use cases considered. Similarly, aircraft communication is also being considered using NR which also demands the highest standard of reliability and strict latency requirements. The long distances and mobility aspects together with latency and reliability requirements present challenges in this use case.

As observed by these use cases, in some URLLC scenarios, mobility is a key requirement together with latency and reliability. A core need of each URLLC use case is reliability and latency and these needs should have precedence over resource efficiency due to criticality of the scenarios.

Both International Telecommunication Union (ITU) and 3GPP have defined a set of requirements for 5G, including URLLC. For URLLC reliability, the requirement is the same, whereas for URLLC latency, 3GPP places a stricter requirement of 0.5 ms one-way end-to-end latency in UL and DL, compared to 1ms in ITU.

3GPP has agreed on the following relevant requirements. Reliability can be evaluated by the success probability of transmitting X bytes within a certain delay, which is the time it takes to deliver a small data packet from the radio protocol layer 2/3 SDU ingress point to the radio protocol layer 2/3 SDU egress point of the radio interface, at a certain channel quality (e.g., coverage-edge). A general URLLC reliability requirement for one transmission of a packet is $1-10^5$ for 32 bytes with a user plane latency of 1ms.

User plane (UP) latency can be described as the time it takes to successfully deliver an application layer packet/message from the radio protocol layer 2/3 SDU ingress point to the radio protocol layer 2/3 SDU egress point via the radio interface in both uplink and downlink directions, where neither device nor base station reception is restricted by DRX. For URLLC, the target for user plane latency should be 0.5 ms for UL, and 0.5 ms for DL. Furthermore, if possible, the latency should also be low enough to support the use of the next generation access technologies as a wireless transport technology that can be used within the next generation access architecture. The value above should be considered an average value and does not have an associated high reliability requirement.

According to IMT 2020, LTE Rel-15 should be able to separately fulfill low latency and reliability requirements. Low latency may be defined as the one-way time it takes to successfully deliver an application layer packet/message from the radio protocol layer 2/3 SDU ingress point to the radio protocol layer 2/3 SDU egress point of the radio interface in either uplink or downlink in the network for a given service in unloaded conditions, assuming the mobile station is in the active state. In IMT 2020, the minimum requirements for user plane latency is 1 ms for URLLC.

Reliability may be defined as the success probability of transmitting a layer 2/3 packet within a required maximum time, which is the time it takes to deliver a small data packet from the radio protocol layer 2/3 SDU ingress point to the radio protocol layer 2/3 SDU egress point of the radio interface at a certain channel quality (e.g., coverage-edge). This requirement is defined for the purpose of evaluation in the related URLLC test environment.

The minimum requirement for the reliability is $1-10^{-5}$ success probability of transmitting a data packet of size (e.g., 20 bytes) bytes within 1 ms in channel quality of coverage edge for the Urban macro-URLLC test environment.

Apart from the ITU and 3GPP requirements, there are other interesting combinations of latency and reliability that may apply to future use cases. One such case is a wide-area scenario with a more relaxed latency but with high reliability. Therefore, we argue that a network should be able to configure a wide range of latency-reliability settings. To enable this, several different technological components may be considered for URLLC. Therefore, URLLC may fulfil IMT 2020 requirements and also a wider range of requirements relevant for future use cases.

As mentioned above, a wide range of performance requirements calls for a set of tools for the network to apply according to use case and scenario. At the physical layer, this can include enhanced coding, diversity, repetitions, and extra robust control and feedback. At higher layers, the focus is fast and reliable scheduling, data duplication, and mobility robustness.

Diversity is a key to achieve high reliability. Whereas one single transmission (including control message) can be robust (e.g., low BLER), it requires a very low code rate and therefore wide allocations to reach the target. With diversity, the transmission is spread out in time, space, and frequency, exploiting variations in the channel to maximize the signal.

In time domain, at least two main options may be employed. One option is that the transmission is extended over more OFDM symbols and thereby the code rate is reduced. Alternatively, the transmission is repeated. A repetition can be automatic (bundled transmissions), or a retransmission triggered by feedback.

In frequency domain, the transmission of control and data may be repeated on multiple carriers to exploit frequency diversity of the channel. Frequency repetition of data can be done on lower layers (e.g., MAC) or in higher layers (e.g., PDCP). Another possibility for achieving frequency diversity is to spread out parts of the transmissions over a wider bandwidth.

For UL transmissions, the basic access may be based on a scheduling request (SR). The SR may be followed by an UL grant, and only after receiving this grant can the UE 102 transmit UL data. The two first transmissions (SR and grant) cause an extra delay, which may be an issue for delay sensitive traffic. Latency reduction is a feature in LTE-14 to scale down the minimum schedulable time unit so that the absolute time duration of the first two transmissions is scaled down proportionally. Similar principles can be applied to 5G with tools such as higher numerology. This, in principle, can satisfy the latency requirements and allow several HARQ retransmissions round-trip-time that further enhance the reliability. However, with higher numerology, it poses challenges to support wide-area deployment with power-limited UEs 102 and requires a larger bandwidth. Last but not the least, additional works to enhance reliability for SR and UL grant are required.

As an alternative, the UL grant can be configured (e.g., like SPS UL) with skip padding in LTE. This may be referred to as "Fast UL." With Fast UL, the UE 102 has a configured UL grant that it may use when it has UL data. In this setup, the UL latency is similar to that of DL, making it an important enhancement for URLLC.

Given the large BW allocations expected for URLLC UL traffic, a configured grant where the gNB 160 pre-allocates a part of the band to a UE 102 can lead to UL capacity problems. This leads to even larger resource waste if the URLLC UL traffic is less frequent and sporadic. This issue can be solved if the same time-frequency resource can be given to multiple UEs 102.

Collisions may occur in contention-based access. To satisfy the strict URLLC requirements, resolutions must be resolved in a reliable way and remedial solutions may be in place in the event of the collisions. As a baseline, reliable UE identification should be available for contention-based access in the case of collided transmissions. After detecting the collision, fast switching to grant-based resources should be available. In addition, automatic repetitions with a predefined hopping pattern can reduce requirements on collision probability and UE identification detection.

The requirement on latency and reliability is not only for static UEs 102, but also for UEs 102 with different mobility levels for different use cases.

Increased robustness can be achieved at higher layers by transmitting duplicates of the data in either the spatial domain (e.g., Dual Connectivity), frequency domain (e.g., Carrier Aggregation), or in time domain with MAC/RLC layer duplication. Optionally, without duplication, better reception quality can be achieved by properly selecting between a set of available connecting links (e.g., Multiple Connectivity).

In another aspect, a buffer status reporting (BSR) procedure may be used to provide the serving eNB 160 with information about the amount of data available for transmission in the UL buffers associated with the MAC entity. RRC controls BSR reporting by configuring the three timers periodicBSR-Timer, retxBSR-Timer and logicalChannelSR-ProhibitTimer and by, for each logical channel, optionally signaling logicalChannelGroup, which allocates the logical channel to a Logical Channel Group (LCG).

For the Buffer Status reporting procedure, the MAC entity may consider radio bearers that are not suspended and may consider radio bearers that are suspended. For narrowband Internet of Things (NB-IoT), the Long BSR is not supported and all logical channels belong to one LCG.

A (BSR) may be triggered if any of the following events occur. A BSR may be triggered if UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG. In this case, the BSR may be referred to as a "Regular BSR."

A BSR may also be triggered if UL resources are allocated and the number of padding bits is equal to or larger than the size of the BSR MAC control element plus its subheader. In this case, the BSR may be referred to as a "Padding BSR."

A BSR may also be triggered if the retxBSR-Timer expires and the MAC entity has data available for transmission for any of the logical channels which belong to a LCG. In this case, the BSR may be referred to as a "Regular BSR."

A BSR may also be triggered if a periodicBSR-Timer expires. In this case, the BSR may be referred to as a "Periodic BSR."

For a Regular BSR, if the BSR is triggered due to data becoming available for transmission for a logical channel for which logicalChannelSR-ProhibitTimer is configured by upper layers, a UE 102 may start or restart the logicalChannelSR-ProhibitTimer. Otherwise, if running, the UE 102 may stop the logicalChannelSR-ProhibitTimer.

For Regular and Periodic BSR, if more than one LCG has data available for transmission in the TTI where the BSR is transmitted, the UE 102 may report a Long BSR. Otherwise, the UE 102 may report a Short BSR.

For a Padding BSR, if the number of padding bits is equal to or larger than the size of the Short BSR plus its subheader but smaller than the size of the Long BSR plus its subheader and if more than one LCG has data available for transmission in the TTI where the BSR is transmitted, the UE 102 may report a truncated BSR of the LCG with the highest priority logical channel with data available for transmission. Otherwise, the UE 102 may report a Short BSR. If the number of padding bits is equal to or larger than the size of the Long BSR plus its subheader, the UE 102 may report a long BSR.

If the BSR procedure determines that at least one BSR has been triggered and not cancelled and if the MAC entity has UL resources allocated for new transmission for this TTI, then the UE 102 may instruct the Multiplexing and Assembly procedure to generate the BSR MAC control element(s). The UE 102 may start or restart the periodicBSR-Timer except when all the generated BSRs are Truncated BSRs. The UE 102 may start or restart a retxBSR-Timer.

If a Regular BSR has been triggered and logicalChannelSR-ProhibitTimer is not running, and if an uplink grant is not configured or the Regular BSR was not triggered due to data becoming available for transmission for a logical channel for which logical channel SR masking (logicalChannelSR-Mask) is setup by upper layers, then a Scheduling Request may be triggered.

A MAC PDU may contain at most one MAC BSR control element, even when multiple events trigger a BSR by the time a BSR can be transmitted in which case the Regular BSR and the Periodic BSR have precedence over the padding BSR. The MAC entity shall restart retxBSR-Timer upon indication of a grant for transmission of new data on any UL-SCH.

All triggered BSRs may be cancelled in case the UL grant(s) in this TTI can accommodate all pending data available for transmission but is not sufficient to additionally accommodate the BSR MAC control element plus its subheader. All triggered BSRs may be cancelled when a BSR is included in a MAC PDU for transmission.

The MAC entity may transmit at most one Regular/Periodic BSR in a TTI. If the MAC entity is requested to transmit multiple MAC PDUs in a TTI, it may include a padding BSR in any of the MAC PDUs which do not contain a Regular/Periodic BSR.

All BSRs transmitted in a TTI may reflect the buffer status after all MAC PDUs have been built for this TTI. Each LCG may report at the most one buffer status value per TTI and this value may be reported in all BSRs reporting buffer status for this LCG.

It should be noted that padding BSR is not allowed to cancel a triggered Regular/Periodic BSR, except for NB-IoT. A Padding BSR is triggered for a specific MAC PDU only and the trigger may be cancelled when this MAC PDU has been built.

A MAC PDU is a bit string that is byte aligned (i.e., multiple of 8 bits) in length. As described herein, bit strings are represented by tables in which the most significant bit is the leftmost bit of the first line of the table, the least significant bit is the rightmost bit on the last line of the table, and more generally the bit string is to be read from left to right and then in the reading order of the lines. The bit order of each parameter field within a MAC PDU is represented with the first and most significant bit in the leftmost bit and the last and least significant bit in the rightmost bit.

MAC SDUs are bit strings that are byte-aligned (i.e., multiple of 8 bits) in length. An SDU is included into a MAC PDU from the first bit onward. The MAC entity may ignore the value of Reserved bits in downlink MAC PDUs.

Figure 4:
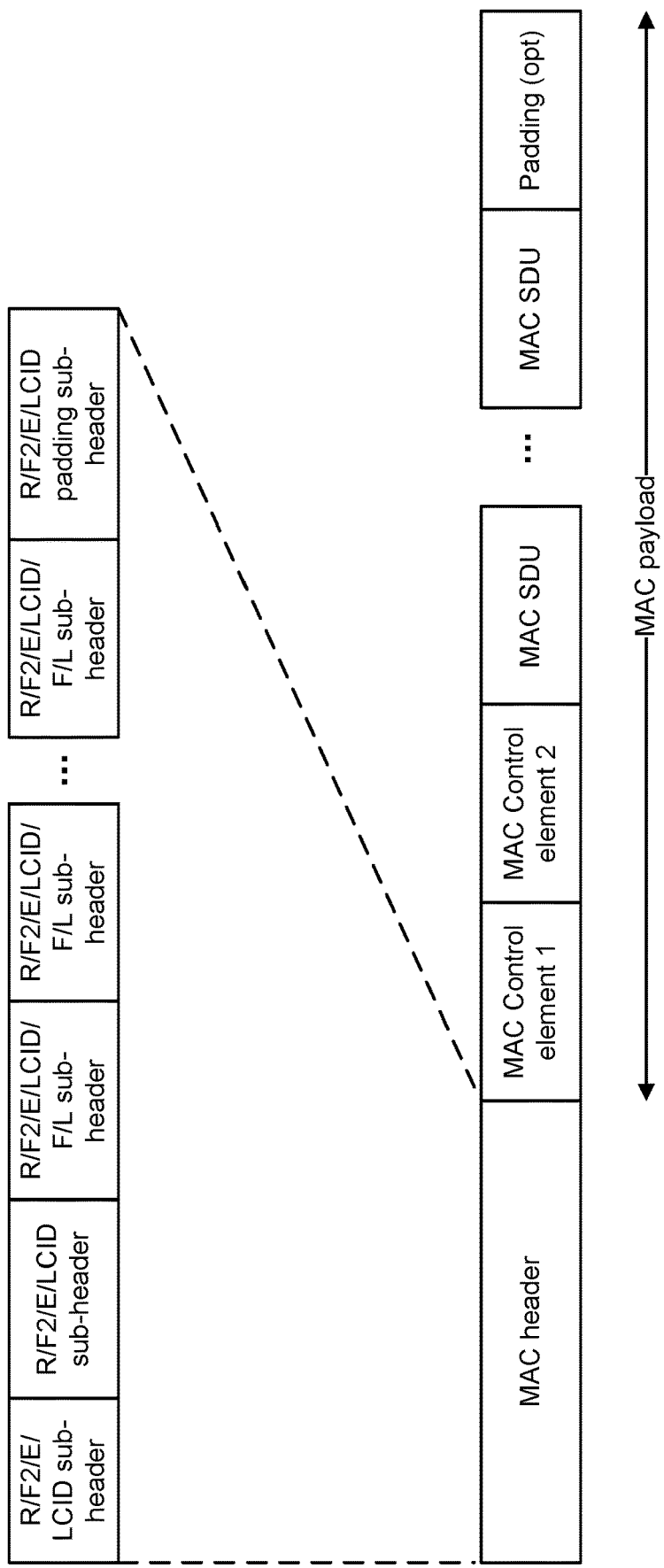
FIG. 4 is an example of medium access control (MAC) Protocol Data Unit (PDU)

A MAC PDU includes a MAC header, zero or more MAC Service Data Units (MAC SDU), zero, or more MAC control elements, and optionally padding, as illustrated in FIG. 4. Both the MAC header and the MAC SDUs may be of variable sizes. A MAC PDU header may include one or more MAC PDU subheaders. Each subheader may correspond to either a MAC SDU, a MAC control element or padding. Examples of MAC PDU subheaders are described in connection with FIG. 5.

A MAC PDU subheader may include the five or six header fields R/F2/E/LCID/(F)/L but for the last subheader in the MAC PDU and for fixed sized MAC control elements. The last subheader in the MAC PDU and subheaders for fixed sized MAC control elements may include the four header fields R/F2/E/LCID. A MAC PDU subheader corresponding to padding includes the four header fields R/F2/E/LCID.

MAC PDU subheaders may have the same order as the corresponding MAC SDUs, MAC control elements and padding. MAC control elements may be placed before any MAC SDU. Padding may occur at the end of the MAC PDU, except when single-byte or two-byte padding is required. Padding may have any value and the MAC entity may ignore it. When padding is performed at the end of the MAC PDU, zero or more padding bytes are allowed. When single-byte or two-byte padding is required, one or two MAC PDU subheaders corresponding to padding are placed at the beginning of the MAC PDU before any other MAC PDU subheader. A maximum of one MAC PDU can be transmitted per Transport Block (TB) per MAC entity. A maximum of one MCH MAC PDU can be transmitted per TTI.

BSR MAC control elements may include one of the following formats. One format is a short BSR and truncated BSR format. This format has one LCG ID field and one corresponding Buffer Size field, as depicted in FIG. 6(a). Another format is a long BSR format. This format has four Buffer Size fields, corresponding to LCG IDs #0 through #3, as depicted in FIG. 6(b).

The BSR formats are identified by MAC PDU subheaders with LCIDs. The fields LCG ID and Buffer Size are defined herein. The Logical Channel Group ID (LCG ID) field identifies the group of logical channel(s) whose buffer status is being reported. The length of the field is 2 bits.

The Buffer Size field identifies the total amount of data available across all logical channels of a logical channel group after all MAC PDUs for the TTI have been built. The amount of data is indicated in a number of bytes. The Buffer Size field may include all data that is available for transmission in the RLC layer and in the PDCP layer. The size of the RLC and MAC headers are not considered in the buffer size computation.

The length of this field is 6 bits. If extendedBSR-Sizes is not configured, the values taken by the Buffer Size field are shown in Table 1. If extendedBSR-Sizes is configured, the values taken by the Buffer Size field are shown in Table 2.

TABLE 1

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS >150000 |

TABLE 2

| Index | Buffer Size (BS) value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| 7 | 29 < BS <= 35 |
| 8 | 35 < BS <= 43 |

TABLE 2-continued

| Index | Buffer Size (BS) value [bytes] |
|---|---|
| 9 | 43 < BS <= 53 |
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |
| 29 | 2657 < BS <= 3267 |
| 30 | 3267 < BS <= 4017 |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134986 |
| 48 | 134986 < BS <= 165989 |
| 49 | 165989 < BS <= 204111 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |
| 58 | 1067031 < BS <= 1312097 |
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

Figure 7:
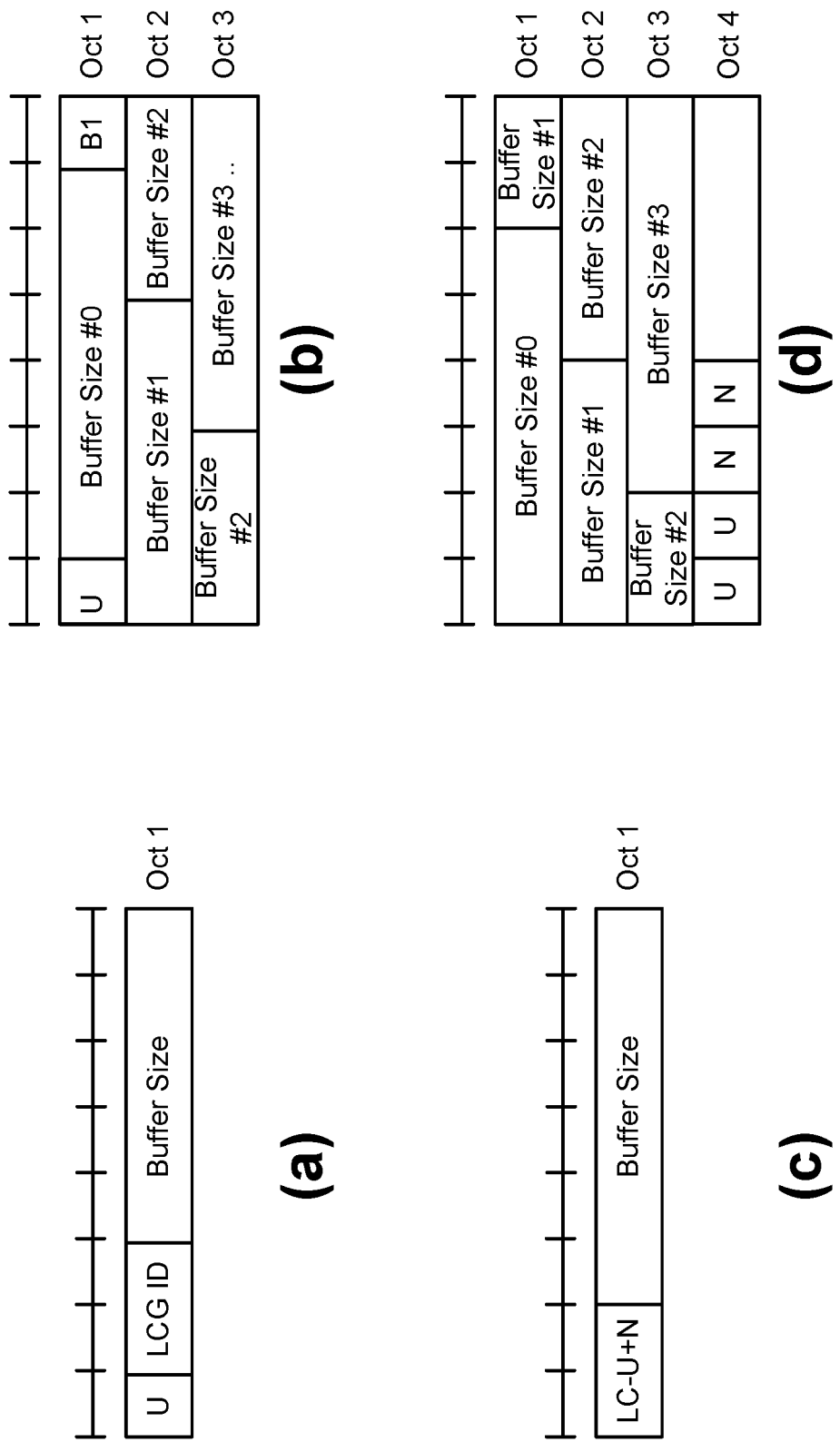
FIG. 7 are examples illustrating BSR MAC control elements for indicating URLLC and possible associated numerologies.

The systems and methods described herein provide a mechanism to indicate activities of URLLC services in an LTE-based BSR to facilitate the granting and allocation of higher priority bandwidth to a 5G NR UE 102. In an implementation, a flag may be included in the MAC Control Element containing the 5G NR BSR to indicate to the gNB 160 that URLLC is included in the bandwidth (BW) request. A flag may indicate the attributes of the URLLC service(s) being sought in establishing a new Data Radio Bearer (DRB) during different RRC Connection Establishment Procedures. In an implementation, the flag may be added to a LogicalChannelConfig information element (IE). FIG. 7 provides examples of BSRs with a MAC control element for indicating URLLC and associated numerologies among the Logical channel groups included in the BSR message.

An example of an RRC connection establishment procedure is described in connection with FIG. 8. The purpose of this procedure is to establish or resume an RRC connection. RRC connection establishment involves SRB1 establishment. The procedure is also used to transfer the initial NAS dedicated information/message from the UE 102 to E-UTRAN.

E-UTRAN may apply the RRC connection establishment procedure. In one case, when establishing an RRC connection, the E-UTRAN may establish SRB1 and, for NB-IoT, SRB1bis. When resuming an RRC connection, the E-UTRAN may restore the AS configuration from a stored context including resuming SRB(s) and DRB(s).

The following is a list of commands that may include the URLLC indication: an RRCConnectionRequest message in accordance with 5.3.3.3; an RRCConnectionSetup in accordance with 5.3.3.4; an RRCConnectionResumeRequest message in accordance with 5.3.3.4; an RRCConnectionReconfiguration message in accordance with 5.3.5.3; and an RRCConnectionReestablishmentRequest message in accordance with 5.3.7.4.

The UE 102 can also indicate specific priority (e.g., URLLC) by using a specific preamble access code belonging to specific group (e.g., URLLC based preambles). These preambles will be provided by system information broadcast (SIBs) and acquired by the UE 102 prior to accessing the system. Alternatively, the gNB 160 may assign the code to the UE 102 with an indication of its use (e.g., URLLC access).

Alternatively, the access code (i.e., preamble+additional information) can have an additional block of information to indicate the priority level (e.g., URLLC access) beside UE identifications. In this case, the gNB 160 may expedite the allocation of the grant and put it on the higher priority queue.

An example of a random access preamble is also described herein. The physical layer random access burst includes a cyclic prefix, a preamble, and a guard time during which nothing is transmitted. The random access preambles may be generated from Zadoff-Chu sequences with zero correlation zone (ZC-ZCZ) or generated from one or several root Zadoff-Chu sequences.

Figure 9:
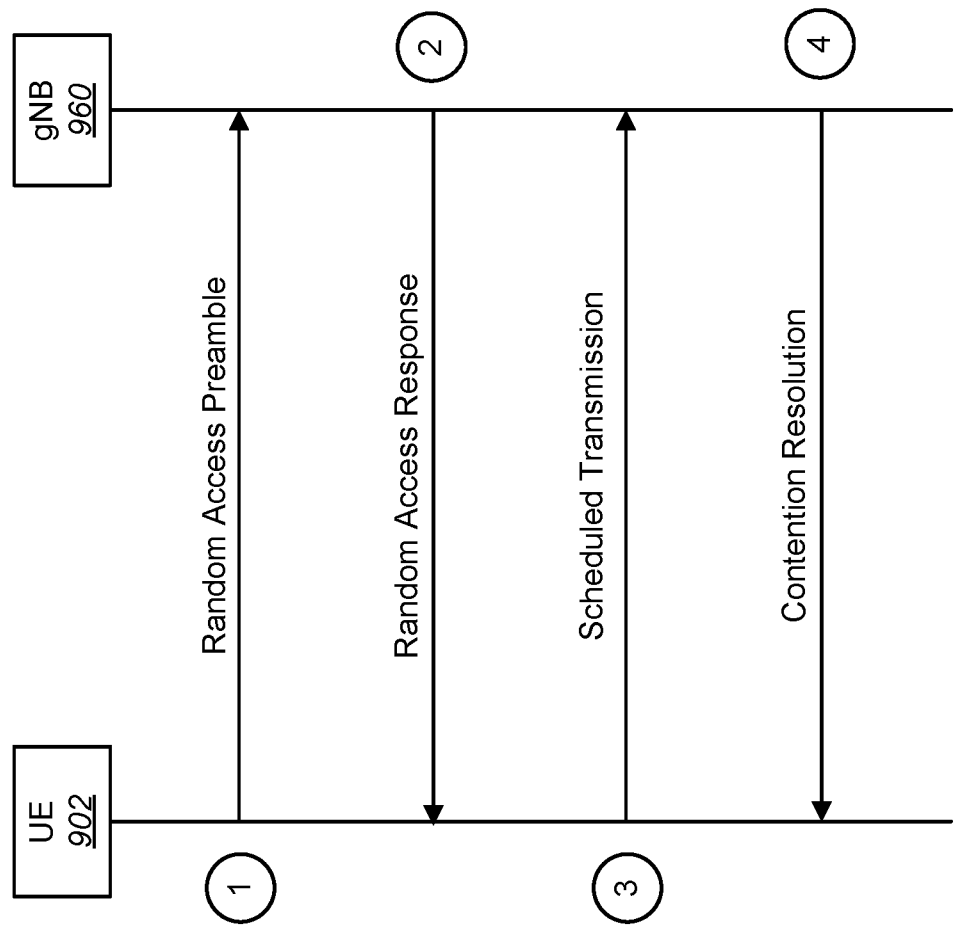
FIG. 9 is an example illustrating a contention-based random access procedure.

A contention-based random access procedure is outlined on FIG. 9. A non-contention based random access procedure is outlined in FIG. 10.

Radio resource control information elements are also described herein. The IE LogicalChannelConfig may be used to configure the logical channel parameters, as illustrated in Listing 1.

Listing 1

```
-- ASN1START
LogicalChannelConfig ::=     SEQUENCE {
  ul-SpecificParameters      SEQUENCE {
    URLLC-Indicator          URLLC
    priority                 INTEGER (1..16),
    prioritisedBitRate       ENUMERATED {
                               kBps0, kBps8, kBps16,
                               kBps32, kBps64, kBps128,
                               kBps256, infinity,
                               kBps512-v1020,
                               kBps1024-v1020,
                               kBps2048-v1020, spare5,
                               spare4, spare3, spare2,
                               spare1},
    bucketSizeDuration       ENUMERATED {
                               ms50, ms100, ms150,
                               ms300, ms500, ms1000,
                               spare2, spare1},
```

Listing 1

```
        logicalChannelGroup              INTEGER (0..3)
            OPTIONAL        -- Need OR
    }  OPTIONAL,
    ...,
    [[ logicalChannelSR-Mask-r9          ENUMERATED {setup}
        OPTIONAL        -- Cond Srmask
    ]],
    [[ logicalChannelSR-Prohibit-r12     BOOLEAN
        OPTIONAL        -- Need ON
    ]]
}
-- ASN1STOP
```

The following are field descriptions for LogicalChannelConfig of Listing 1. bucketSizeDuration is the Bucket Size Duration for logical channel prioritization in TS 36.321. The value is in milliseconds. Value ms50 corresponds to 50 ms, ms100 corresponds to 100 ms, and so on.

logicalChannelGroup is a mapping of logical channel to logical channel group for BSR reporting in TS 36.321.

logicalChannelSR-Mask is a controlling SR triggering on a logical channel basis when an uplink grant is configured.

logicalChannelSR-Prohibit value TRUE indicates that the logicalChannelSR-ProhibitTimer is enabled for the logical channel. E-UTRAN only (optionally) configures the field (i.e., indicates value TRUE) if logicalChannelSR-ProhibitTimer is configured.

prioritisedBitRate is the prioritized bit rate for logical channel prioritization in TS 36.321. The value is in kilobytes/second. A value kBps0 corresponds to 0 kB/second, kBps8 corresponds to 8 kB/second, kBps16 corresponds to 16 kB/second, and so on. Infinity is the only applicable value for SRB1 and SRB2.

priority is the logical channel priority in TS 36.321. The value is an integer.

URLLC-Indicator is the ultra-reliable low-latency communication service channel indicator.

The SRmask field is optionally present if ul-SpecificParameters is present, need OR; otherwise it is not present. The UL field is mandatory present for UL logical channels; otherwise it is not present.

RRC messages are also described herein. The RRCConnectionRequest message may be used to request the establishment of an RRC connection. The signaling radio bearer may be SRB0. RLC-SAP may be transmission Mode (TM), the Logical channel may be Common Control Channel (CCCH) and the direction may be UE 102 to E-UTRAN. An example of a RRCConnectionRequest message is provided in Listing 2.

Listing 2

```
-- ASN1START
RRCConnectionRequest ::=    SEQUENCE {
    criticalExtensions          CHOICE {
        rrcConnectionRequest-rNR    RRCConnectionRequest-rNR-IEs,
        criticalExtensionsFuture    SEQUENCE { }
    }
}
RRCConnectionRequest-rNR-IEs ::=    SEQUENCE {
    ue-Identity                 InitialUE-Identity,
    establishmentCause          EstablishmentCause,
    spare                       BIT STRING (SIZE (1))
}
InitialUE-Identity ::=      CHOICE {
    s-TMSI                      S-TMSI,
    randomValue                 BIT STRING (SIZE (40))
}
EstablishmentCause ::=      ENUMERATED {
                                emergency, URLLC,
                                highPriorityAccess,
                                mt-Access, mo-Signalling,
                                mo-Data,
                                delayTolerantAccess-v1020,
                                mo-VoiceCall-v1280, spare1}
-- ASN1STOP
```

The following are field descriptions for RRCConnectionRequest of Listing 2. establishmentCause provides the establishment cause for the RRC connection request as provided by the upper layers. With respect to the cause value names: URLLC service, highPriorityAccess concerns AC11 . . . AC15, 'mt' stands for 'Mobile Terminating' and 'mo' for 'Mobile Originating. The gNB 160 is not expected to reject a RRCConnectionRequest due to unknown cause value being used by the UE 102.

randomValue is an integer value in the range 0 to $2^{40}-1$.

ue-Identity is the UE identity included to facilitate contention resolution by lower layers.

The RRCConnectionResume message is used to resume the suspended RRC connection. The signaling radio bearer may be SRB1. The RLC-SAP may be AM. The logical channel may be Dedicated Control Channel (DCCH). The direction may be E-UTRAN to UE 102. An example of the RRCConnectionResume message is provided in Listing 3.

Listing 3

```
-- ASN1START
RRCConnectionResume-rNR ::=  SEQUENCE {
    rrc-TransactionIdentifier    RRC-TransactionIdentifier,
    criticalExtensions           CHOICE {
        c1                           CHOICE {
            rrcConnectionResume-rNR      RRCConnectionResume-rNR-IEs,
            spare3                       NULL,
            spare2                       NULL,
            spare1                       NULL
        },
        criticalExtensionsFuture     SEQUENCE { }
    }
}
RRCConnectionResume-rNR-IEs ::=  SEQUENCE {
    radioResourceConfigDedicated-rNR
            RadioResourceConfigDedicated    OPTIONAL, -- Need ON
    nextHopChainingCount-rNR        NextHopChainingCount,
    measConfig-rNR                  MeasConfig
            OPTIONAL, -- Need ON
    antennaInfoDedicatedPCell-rNR   AntennaInfoDedicated-v
            OPTIONAL, -- Need ON
    drb-ContinueROHC-rNR            ENUMERATED {true}
            OPTIONAL, -- Need OP
    lateNonCriticalExtension        OCTET STRING
            OPTIONAL,
    nonCriticalExtension            SEQUENCE { }
            OPTIONAL
}
-- ASN1STOP
```

In Listing 3, drb-ContinueROHC is a field that indicates whether to continue or reset the header compression protocol context for the DRBs configured with the header compression protocol. The presence of the field indicates that the header compression protocol context continues while absence indicates that the header compression protocol context is reset.

RRC information elements are also described herein. The IE RadioResourceConfigDedicated may be used to setup/modify/release RBs, to modify the MAC main configuration, to modify the SPS configuration and to modify dedicated physical configuration. An example of a RadioResourceConfigDedicated information element is provided in Listing 4.

Listing 4

```
-- ASN1START
RadioResourceConfigDedicated ::=            SEQUENCE {
    srb-ToAddModList                SRB-ToAddModList
        OPTIONAL,    -- Cond HO-Conn
    drb-ToAddModList                DRB-ToAddModList
        OPTIONAL,    -- Cond HO-toEUTRA
    drb-ToReleaseList               DRB-ToReleaseList
        OPTIONAL,    -- Need ON
    mac-MainConfig                  CHOICE {
        explicitValue               MAC-MainConfig,
        defaultValue                NULL
    } OPTIONAL,                                     -- Cond HO-toEUTRA2
    sps-Config                      SPS-Config
        OPTIONAL,    -- Need ON
    physicalConfigDedicated         PhysicalConfigDedicated
        OPTIONAL,    -- Need ON
    ...,
    [[ rlf-TimersAndConstants-r9    RLF-TimersAndConstants-r9
        OPTIONAL    -- Need ON
    ]],
    [[ measSubframePatternPCell-r10 MeasSubframePatternPCell-r10
        OPTIONAL -- Need ON
    ]],
    [[ neighCellsCRS-Info-r11       NeighCellsCRS-Info-r11
        OPTIONAL -- Need ON
    ]],
    [[ naics-Info-r12               NAICS-AssistanceInfo-r12
        OPTIONAL -- Need ON
    ]],
    [[ neighCellsCRS-Info-r13       NeighCellsCRS-Info-r13
        OPTIONAL,    -- Cond CRSIM
      rlf-TimersAndConstants-r13    RLF-TimersAndConstants-r13
        OPTIONAL -- Need ON
    ]]
}
RadioResourceConfigDedicatedPSCell-r12 ::=           SEQUENCE {
    -- UE specific configuration extensions applicable for a
PSCell
    physicalConfigDedicatedPSCell-r12           PhysicalConfigDedicated
        OPTIONAL,    -- Need ON
    sps-Config-r12                  SPS-Config
        OPTIONAL,    -- Need ON
    naics-Info-r12                  NAICS-AssistanceInfo-r12
        OPTIONAL,    -- Need ON
    ...,
    [[ neighCellsCRS-InfoPSCell-r13             NeighCellsCRS-Info-r13
        OPTIONAL -- Need ON
    ]]
}
RadioResourceConfigDedicatedSCG-rNR ::=         SEQUENCE {
    drb-ToAddModListSCG-rNR         DRB-ToAddModListSCG-rNR
        OPTIONAL,    -- Need ON
    mac-MainConfigSCG-r12           MAC-MainConfig
        OPTIONAL,    -- Need ON
    rlf-TimersAndConstantsSCG-r12   RLF-TimersAndConstantsSCG-r12
        OPTIONAL,    -- Need ON
    ...
}
RadioResourceConfigDedicatedSCell-r10 ::=            SEQUENCE {
    -- UE specific configuration extensions applicable for an
SCell
    physicalConfigDedicatedSCell-r10
        PhysicalConfigDedicatedSCell-r10
        OPTIONAL,    -- Need ON
    ...,
    [[ mac-MainConfigSCell-r11      MAC-MainConfigSCell-r11
        OPTIONAL -- Cond SCellAdd
    ]],
    [[ naics-Info-r12               NAICS-AssistanceInfo-r12
        OPTIONAL -- Need ON
```

-continued

| Listing 4 |
|---|

```
]],
[[ neighCellsCRS-InfoSCell-r13           NeighCellsCRS-Info-r13
       OPTIONAL -- Need ON
]]
}
SRB-ToAddModList ::=        SEQUENCE (SIZE (1..2)) OF
  SRB-ToAddMod
SRB-ToAddMod ::= SEQUENCE {
  srb-Identity                INTEGER (1..2),
  rlc-Config                  CHOICE {
    explicitValue              RLC-Config,
    defaultValue               NULL
  }   OPTIONAL,                               -- Cond Setup
  logicalChannelConfig        CHOICE {
    explicitValue              LogicalChannelConfig,
    defaultValue               NULL
  }   OPTIONAL,                               -- Cond Setup
  ...
}
DRB-ToAddModList ::=        SEQUENCE (SIZE (1..maxDRB)) OF
  DRB-ToAddMod
DRB-ToAddModListSCG-rNR ::= SEQUENCE (SIZE (1..maxDRB)) OF
  DRB-ToAddModSCG-r12
DRB-ToAddMod ::= SEQUENCE {
  eps-BearerIdentity               INTEGER (0..15)
       OPTIONAL,    -- Cond DRB-Setup
  drb-Identity                DRB-Identity,
  pdcp-Config                 PDCP-Config
       OPTIONAL,    -- Cond PDCP
  rlc-Config                  RLC-Config
       OPTIONAL,    -- Cond SetupM
  logicalChannelIdentity      INTEGER (3..10)
       OPTIONAL,    -- Cond DRB-SetupM
  logicalChannelConfig        LogicalChannelConfig
       OPTIONAL,    -- Cond SetupM
  ...,
  [[ drb-TypeChange-rNR            ENUMERATED {toMCG}
       OPTIONAL,    -- Need OP
    rlc-Config-                RLC-Config-v
       OPTIONAL     -- Need ON
  ]],
  [[ rlc-Config-                   RLC-Config-v
       OPTIONAL,    -- Need ON
    drb-TypeLWA-r              BOOLEAN
       OPTIONAL,    -- Need ON
    drb-TypeLWIP-              ENUMERATED {
                                 lwip, lwip-DL-only,
                                 lwip-UL-only, eutran}
       OPTIONAL     -- Need ON
  ]]
}
DRB-ToAddModSCG-rNR ::=SEQUENCE {
  drb-Identity-rNR            DRB-Identity,
  drb-Type-rNR                CHOICE {
    split-rNR                  NULL,
    scg-rNR                    SEQUENCE {
      eps-BearerIdentity-rNR           INTEGER (0..15)
         OPTIONAL,  -- Cond DRB-Setup
      pdcp-Config-rNR                  PDCP-Config
         OPTIONAL -- Cond PDCP-S
    }
  }   OPTIONAL,   -- Cond SetupS2
  rlc-ConfigSCG-rNR           RLC-Config
       OPTIONAL,   -- Cond SetupS
  rlc-Config-v                RLC-Config-v1250
       OPTIONAL,   -- Need ON
  logicalChannelIdentitySCG-r  INTEGER (3..10)
       OPTIONAL,   -- Cond DRB-SetupS
  logicalChannelConfigSCG-r   LogicalChannelConfig
       OPTIONAL,   -- Cond SetupS
  ...
}
DRB-ToReleaseList ::=       SEQUENCE (SIZE (1..maxDRB)) OF
  DRB-Identity
```

Listing 4

```
MeasSubframePatternPCell-r10 ::=            CHOICE {
    release                                 NULL,
    setup                                   MeasSubframePattern-r10
}
NeighCellsCRS-Info-r11 ::=                  CHOICE {
    release                                 NULL,
    setup                                   CRS-AssistanceInfoList-r11
}
CRS-AssistanceInfoList-r11 ::=              SEQUENCE (SIZE
    (1..maxCellReport)) OF CRS-AssistanceInfo-r11
CRS-AssistanceInfo-r11 ::= SEQUENCE {
    physCellId-r11                          PhysCellId,
    antennaPortsCount-r11                   ENUMERATED {an1, an2, an4,
                                                spare1},
    mbsfn-SubframeConfigList-r11            MBSFN-SubframeConfigList,
    ...
}
NeighCellsCRS-Info-r13 ::=                  CHOICE {
    release                                 NULL,
    setup                                   CRS-AssistanceInfoList-r13
}
CRS-AssistanceInfoList-r13 ::=              SEQUENCE (SIZE
    (1..maxCellReport)) OF CRS-AssistanceInfo-r13
CRS-AssistanceInfo-r13 ::= SEQUENCE {
    physCellId-r13                          PhysCellId,
    antennaPortsCount-r13                   ENUMERATED {an1, an2, an4,
                                                spare1},
    mbsfn-SubframeConfigList-r13            MBSFN-SubframeConfigList
        OPTIONAL,    -- Need ON
    ...
}
NAICS-AssistanceInfo-r12 ::=                CHOICE {
    release                                 NULL,
    setup                                   SEQUENCE {
        neighCellsToReleaseList-r12             NeighCellsToReleaseList-r12
            OPTIONAL ,   -- Need ON
        neighCellsToAddModList-r12              NeighCellsToAddModList-r12
            OPTIONAL,   -- Need ON
        servCellp-a-r12                         P-a
            OPTIONAL    -- Need ON
    }
}
NeighCellsToReleaseList-r12 ::=             SEQUENCE (SIZE
    (1..maxNeighCell-r12)) OF PhysCellId
NeighCellsToAddModList-r12 ::=              SEQUENCE (SIZE
    (1..maxNeighCell-r12)) OF NeighCellsInfo-r12
NeighCellsInfo-r12        ::=               SEQUENCE {
    physCellId-r12                          PhysCellId,
    p-b-r12                                 INTEGER (0..3),
    crs-PortsCount-r12                      ENUMERATED {n1, n2, n4, spare},
    mbsfn-SubframeConfig-r12                MBSFN-SubframeConfigList
        OPTIONAL,   -- Need ON
    p-aList-r12                             SEQUENCE (SIZE
        (1..maxP-a-PerNeighCell-r12)) OF P-a,
    transmissionModeList-r12                BIT STRING (SIZE(8)),
    resAllocGranularity-r12                 INTEGER (1..4),
    ...
}
P-a ::= ENUMERATED { dB-6, dB-4dot77, dB-3, dB-1dot77,
                    dB0, dB1, dB2, dB3}
-- ASN1STOP
```

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB URLLC module 194. The gNB URLLC module 194 may perform scheduling request operations as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
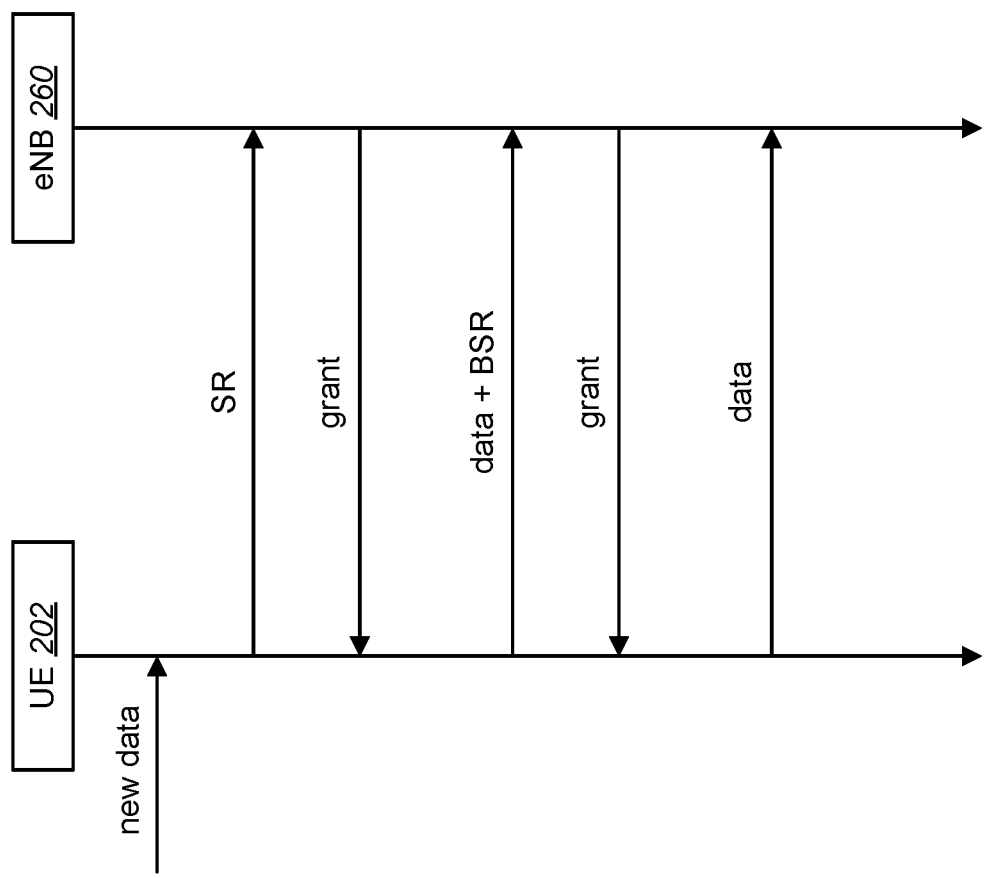
FIG. 2 is a call flow diagram illustrating a scheduling procedure for dynamic scheduling in LTE.

FIG. 2 is a call flow diagram illustrating a scheduling procedure for dynamic scheduling in LTE. When the UE 202 has new data, the UE 202 may send a scheduling request (SR) to the eNB 260. The eNB 260 may respond to the SR by sending a grant to the UE 202. The eNB 260 provides a default UL grant which is used by the UE 202 to transmit the data and/or BSR.

In response to the BSR, the eNB 260 sends another grant. The UE 202 then sends the remaining data to the eNB 260.

A BSR indicates buffer size for each LCG. However, the BSR requires a grant for transmission so it may take a longer time until the eNB 260 receives it, since it is preceded by an SR. It may be case that the provided grant is enough to transmit all data. However, as seen in FIG. 2, it is also likely that a grant is not enough and the UE 202 has to request another grant using BSR. The consequence of this process is additional delay for the case when UE 202 would have been able to transmit all data, had the first UL grant been little bit larger.

As shown in FIG. 2, the complex signaling interaction procedure of SR-UL grant-BSR-UL grant-Data results in latency, processing and signaling overhead. The usages of SR and BSR are limited which cannot provide a better QoS for diverse services in NR.

FIG. 3 is an example illustrating a sidelink Buffer Status Report (BSR) format in LTE. In LTE sidelink operation, each sidelink logical channel group is defined per ProSe destination. A ProSe destination with highest priority is selected for UL scheduling by the network. Therefore, the sidelink BSR format is different than that of the LTE legacy BSR format.

FIG. 4 is an example of medium access control (MAC) Protocol Data Unit (PDU). The MAC PDU includes a MAC header, MAC control elements, MAC SDUs and padding. Both the MAC header and the MAC SDUs may be of variable sizes. A MAC PDU header may include one or more MAC PDU subheaders.

FIG. 5 illustrates examples of MAC PDU subheaders. A first example (a) illustrates an R/F2/E/LCID/F/L MAC subheader with a 7-bits L field. A second example (b) illustrates an R/F2/E/LCID/F/L MAC subheader with a 15-bits L field. A third example (c) illustrates an R/F2/E/LCID/L MAC subheader with a 16-bits L field. A fourth example (d) illustrates an R/F2/E/LCID MAC subheader.

In FIG. 5, LCID is the Logical Channel ID field that identifies the logical channel instance of the corresponding MAC SDU or the type of the corresponding MAC control element or padding for the DL-SCH, UL-SCH and MCH respectively. There may be one LCID field for each MAC SDU, MAC control element or padding included in the MAC PDU. In addition to that, one or two additional LCID fields may be included in the MAC PDU, when single-byte or two-byte padding is required but cannot be achieved by padding at the end of the MAC PDU. A UE 102 of Category 0 may indicate CCCH using LCID "01011", otherwise the UE 102 may indicate CCCH using LCID "00000". The LCID field size is 5 bits.

The Length (L) field indicates the length of the corresponding MAC SDU or variable-sized MAC control element in bytes. There is one L field per MAC PDU subheader except for the last subheader and subheaders corresponding to fixed-sized MAC control elements. The size of the L field is indicated by the F field and F2 field.

The Format (F) field indicates the size of the Length field. There is one F field per MAC PDU subheader except for the last subheader and subheaders corresponding to fixed-sized MAC control elements and except for when F2 is set to 1. The size of the F field is 1 bit. If the F field is included, and if the size of the MAC SDU or variable-sized MAC control element is less than 128 bytes, the value of the F field is set to 0, otherwise it is set to 1.

The Format2 (F2) field indicates the size of the Length field. There is one F2 field per MAC PDU subheader. The size of the F2 field is 1 bit. If the size of the MAC SDU or variable-sized MAC control element is larger than 32767 bytes, and if the corresponding subheader is not the last subheader, the value of the F2 field is set to 1, otherwise it is set to 0.

The Extension (E) field is a flag indicating if more fields are present in the MAC header or not. The E field is set to "1" to indicate another set of at least R/F2/E/LCID fields.

The E field is set to "0" to indicate that either a MAC SDU, a MAC control element or padding starts at the next byte.

The Reserved (R) bit may be set to "0".

Figure 6:
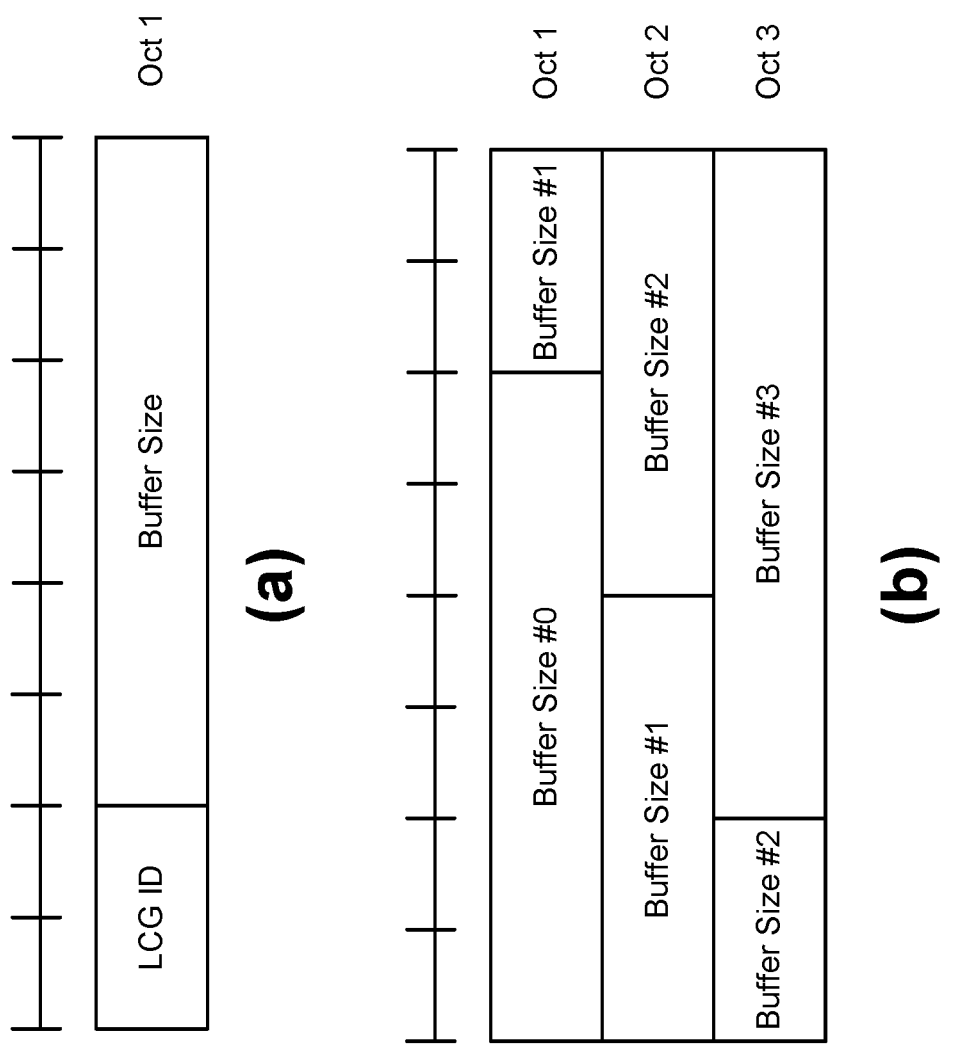
FIG. 6 illustratesBSR MAC control elements.

FIG. 6 illustratesBuffer Status Report (BSR) MAC control elements. A first example (a) illustrates a short BSR and truncated BSR MAC control element. A second example (b) illustrates a long BSR MAC control element.

FIG. 7 are examples illustrating BSR MAC control elements for indicating URLLC. A first example (a) is a short BSR and truncated BSR MAC control element with URLLC indication (U-Flag) URLLC and associated numerologies (N) among the Logical channel groups included in the BSR message. A second example (b) is a long BSR MAC control element with URLLC indication (U-Flag). A third example (c) is a short BSR and truncated BSR MAC control element with Logical Channel (LC) for URLLC (LC-U+N), where N is the numerology index indication. A fourth example (d) is a long BSR MAC control element with LCG or LC with URLLC Indicator (U) URLLC and associated numerologies (N) among the Logical channel groups included in the BSR message.

Figure 8:
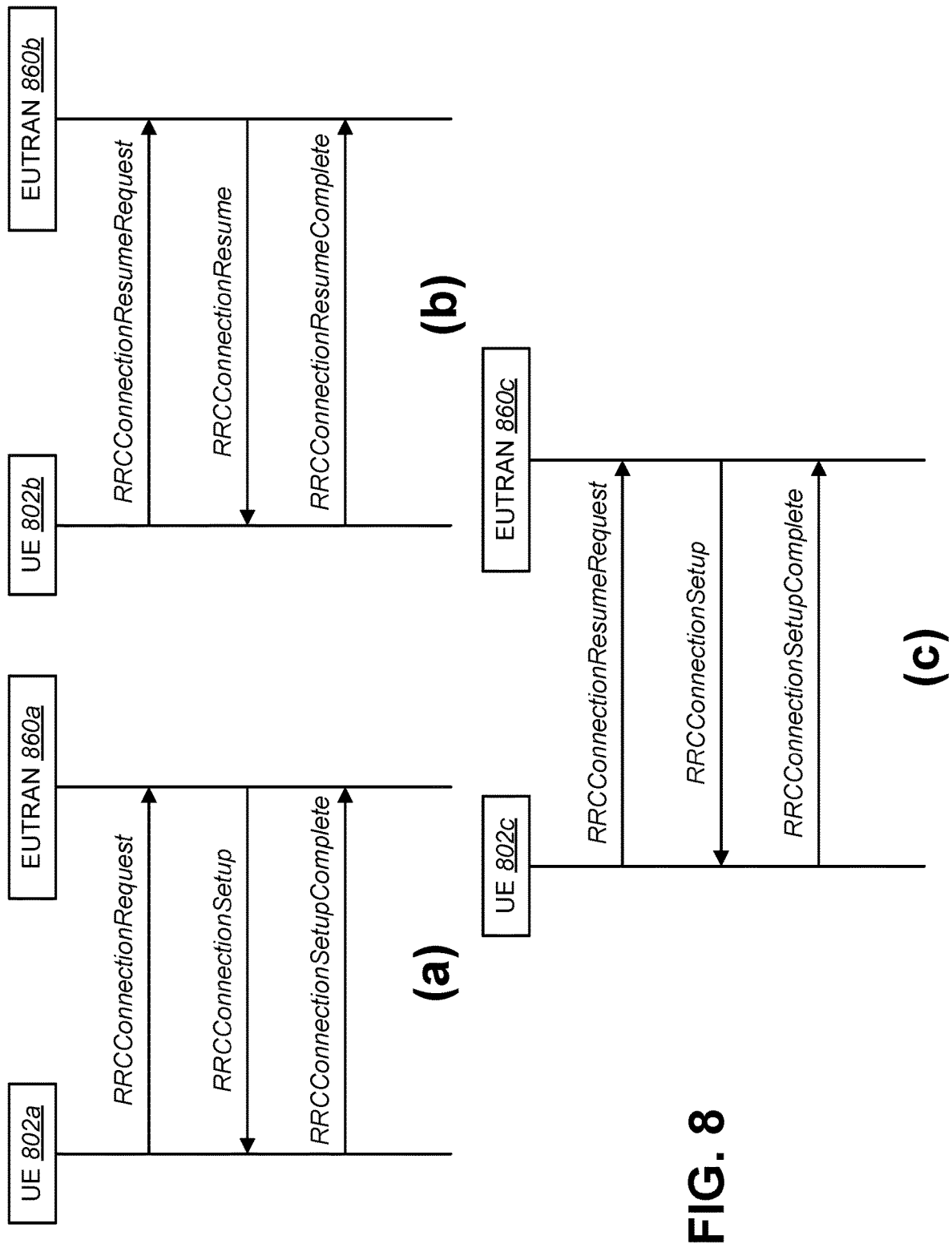
FIG. 8 illustrates examples of a Radio Resource Control (RRC) connection establishment procedure.

FIG. 8 illustrates examples of a radio resource control (RRC) connection establishment procedure. A first example (a) illustrates a successful RRC connection establishment. The UE 802*a* sends an RRCConnectionRequest message to the E-UTRAN 860*a*. The E-UTRAN 860*a* responds by sending an RRCConnectionSetup message to the UE 802*a*. The UE 802*a* then sends an RRCConnectionSetupComplete message.

A second example (b) illustrates a successful RRC connection resume procedure. The UE 802*b* sends an RRCConnectionResumeRequest message to the E-UTRAN 860*b*. The E-UTRAN 860*b* responds by sending an RRCConnectionResume message to the UE 802*b*. The UE 802*b* then sends an RRCConnectionResumeComplete message.

A third example (c) illustrates a successful RRC connection resume fallback to RRC connection establishment. The UE 802*c* sends an RRCConnectionResumeRequest message to the E-UTRAN 860*c*. The E-UTRAN 860*c* responds by sending an RRCConnectionSetup message to the UE 802*c*. The UE 802*c* then sends an RRCConnectionSetupComplete message.

As described above, the list of commands that may include the URLLC indication include the RRCConnectionRequest message, the RRCConnectionSetup message, the RRCConnectionResumeRequest message, the RRCConnectionReconfiguration message, and the RRCConnectionReestablishmentRequest message.

FIG. 9 is an example illustrating a contention-based random access procedure. A UE 902 may communicate with a gNB 960. The contention-based random access procedures may include the following steps.

A first step (1) includes a random access preamble on random access channel (RACH) in uplink. There are two possible groups defined and one is optional. If both groups are configured, the size of message 3 and the pathloss are used to determine which group a preamble is selected from. The group to which a preamble belongs provides an indication of the size of the message 3 and the radio conditions at the UE 902. The preamble group information along with the necessary thresholds are broadcast on system information.

A second step (2) includes a random access response generated by MAC on DL-SCH. This step is semi-synchronous (within a flexible window of which the size is one or more TTI) with message 1. In this case, there is no HARQ. The random access response may be addressed to RA-RNTI on PDCCH. The random access response conveys at least RA-preamble identifier, timing alignment information for the pTAG, initial UL grant and assignment of Temporary C-RNTI (which may or may not be made permanent upon contention resolution). The random access response may be intended for a variable number of UEs in one DL-SCH message.

A third step (3) includes a first scheduled UL transmission on UL-SCH. The scheduled transmission uses HARQ. The size of the transport blocks depends on the UL grant conveyed in step 2. For initial access, the scheduled transmission conveys the RRC connection request generated by the RRC layer and transmitted via CCCH. The scheduled transmission conveys at least NAS UE identifier but no NAS message. The RLC TM has no segmentation.

For an RRC Connection Re-establishment procedure, the scheduled transmission conveys the RRC connection re-establishment request generated by the RRC layer and transmitted via CCCH. The RLC TM has no segmentation. The scheduled transmission does not contain any NAS message.

After handover, in the target cell, the scheduled transmission conveys the ciphered and integrity protected RRC Handover Confirm generated by the RRC layer and transmitted via DCCH. The scheduled transmission conveys the C-RNTI of the UE 902 (which was allocated via the Handover Command). The scheduled transmission includes an uplink Buffer Status Report when possible.

For other events, the scheduled transmission conveys at least the C-RNTI of the UE 902.

For NB-IoT, in the procedure to resume the RRC connection, the scheduled transmission conveys a Resume ID to resume the RRC connection. In the procedure to setup the RRC connection, an indication of the amount of data for subsequent transmission(s) on SRB or DRB can be indicated.

A fourth step (4) includes contention resolution on DL. Early contention resolution may be used (i.e., the gNB 960 does not wait for a NAS reply before resolving contention). This is not synchronized with message 3. HARQ may be s supported. This is addressed to: (a) the Temporary C-RNTI on PDCCH for initial access and after radio link failure and (b) the C-RNTI on PDCCH for UE 902 in RRC_CONNECTED. HARQ feedback is transmitted only by the UE 902 which detects its own UE identity, as provided in message 3, echoed in the Contention Resolution message. For initial access and RRC Connection Re-establishment procedure, no segmentation is used (RLC-TM).

A temporary C-RNTI is promoted to C-RNTI for a UE 902 which detects RA success and does not already have a C-RNTI. The temporary C-RNTI is dropped by others. A UE 902 which detects RA success and already has a C-RNTI may resume using its C-RNTI.

When carrier aggregation (CA) is configured, the first three steps of the contention-based random access procedure in FIG. 9 occur on the PCell while contention resolution (step 4 in FIG. 9) can be cross-scheduled by the PCell.

When dual connectivity (DC) is configured, the first three steps of the contention-based random access procedure in FIG. 9 occur on the PCell in a master cell group (MCG) and PSCell in a secondary cell group (SCG). When CA is configured in SCG, the first three steps of the contention-based random access procedures occur on the PSCell while contention resolution (step 4 in FIG. 9) can be cross-scheduled by the PSCell.

Figure 10:
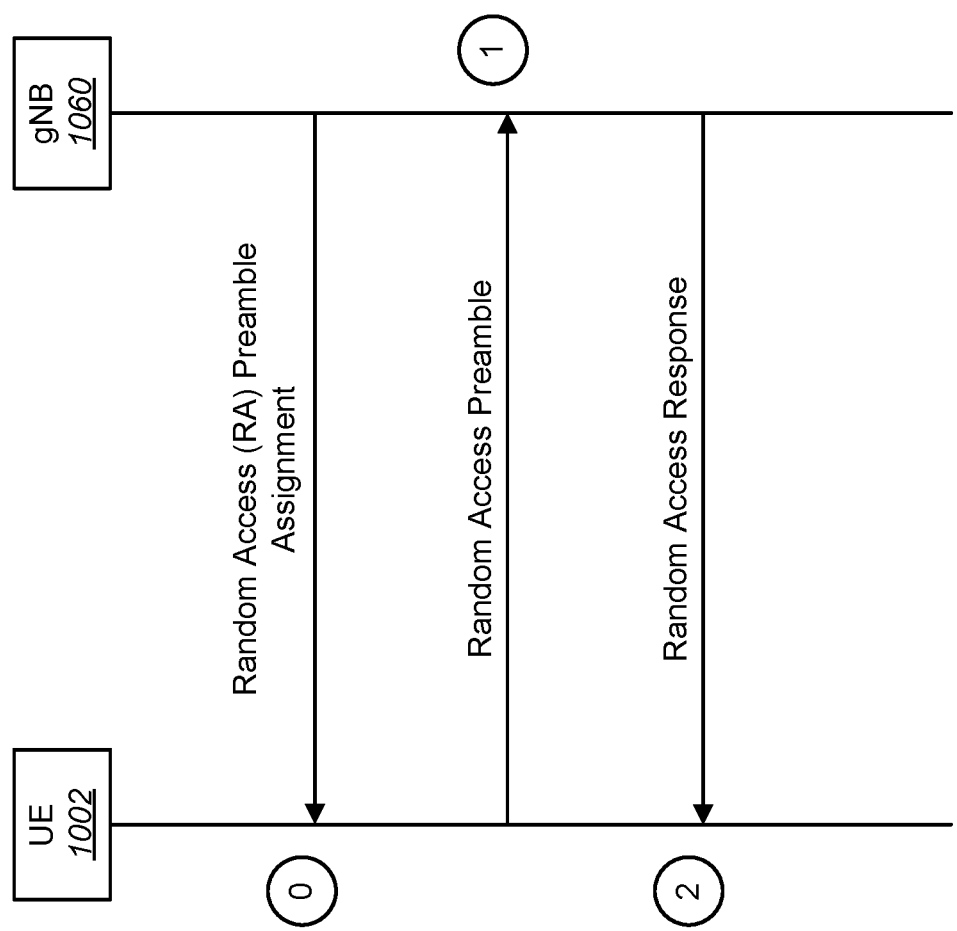
FIG. 10 is an example illustrating a non-contention-based random access procedure.

FIG. 10 is an example illustrating a non-contention-based random access procedure. A UE 1002 may communicate with a gNB 1060. The non-contention-based random access procedures may include the following steps.

A first step (0) is a random access preamble assignment via dedicated signaling in DL. The gNB 1060 assigns to UE 1002 a non-contention Random Access Preamble (a Random Access Preamble not within the set sent in broadcast signaling). The random access preamble may be signaled via one or more of (a) a HO command generated by target gNB 1060 and sent via source gNB 1060 for handover; (b) PDCCH in case of DL data arrival or positioning; (c) PDCCH for initial UL time alignment for a sTAG.

A second step (1) is a random access preamble on RACH in uplink. The UE 1002 may transmit the assigned non-contention random access preamble.

A third step (2) is a random access response on DL-SCH. This may be semi-synchronous (within a flexible window of which the size is two or more TTIs) with message 1. There may be no HARQ. The random access response may be addressed to RA-RNTI on PDCCH. The random access response may convey at least (a) timing alignment information and initial UL grant for handover; (b) timing alignment information for DL data arrival; (c) a RA-preamble identifier; (d) intended for one or multiple UEs in one DL-SCH message.

When performing non-contention based random access on the PCell while CA is configured, the Random Access Preamble assignment via PDCCH of step 0, step 1 and 2 of the non-contention based random access procedure described in connection with FIG. 10 occur on the PCell. In order to establish timing advance for a sTAG, the gNB 1060 may initiate a non-contention based random access procedure with a PDCCH order (step 0) that is sent on a scheduling cell of activated SCell of the sTAG. Preamble transmission (step 1) is on the indicated SCell and Random Access Response (step 2) takes place on PCell.

When performing non-contention-based random access on the PCell or PSCell while DC is configured, the random access preamble assignment via PDCCH of step 0, step 1 and 2 of the non-contention based random access procedure described in connection with FIG. 10 occur on the corresponding cell. In order to establish timing advance for a sTAG, the gNB 1060 may initiate a non-contention based random access procedure with a PDCCH order (step 0) that is sent on a scheduling cell of activated SCell of the sTAG not including PSCell. Preamble transmission (step 1) is on the indicated SCell and Random Access Response (step 2) takes place on PCell for MCG and PSCell for SCG.

Figure 11:
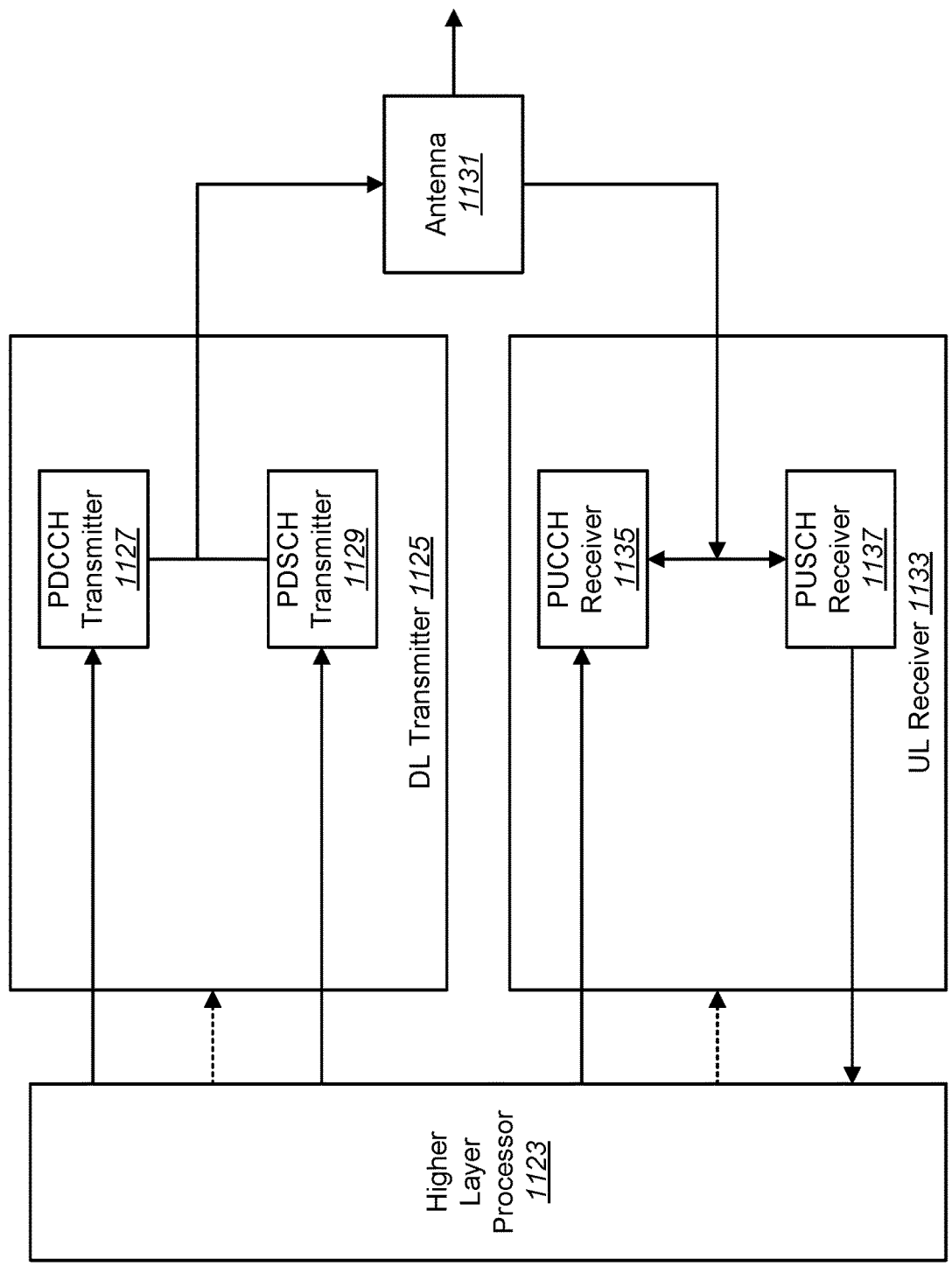
FIG. 11 is a block diagram illustrating one implementation of a gNB.

FIG. 11 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 Uplink Control Information (UCI). The PUSCH receiver 1137 may provide the higher layer processor 1123 received transport blocks.

Figure 12:
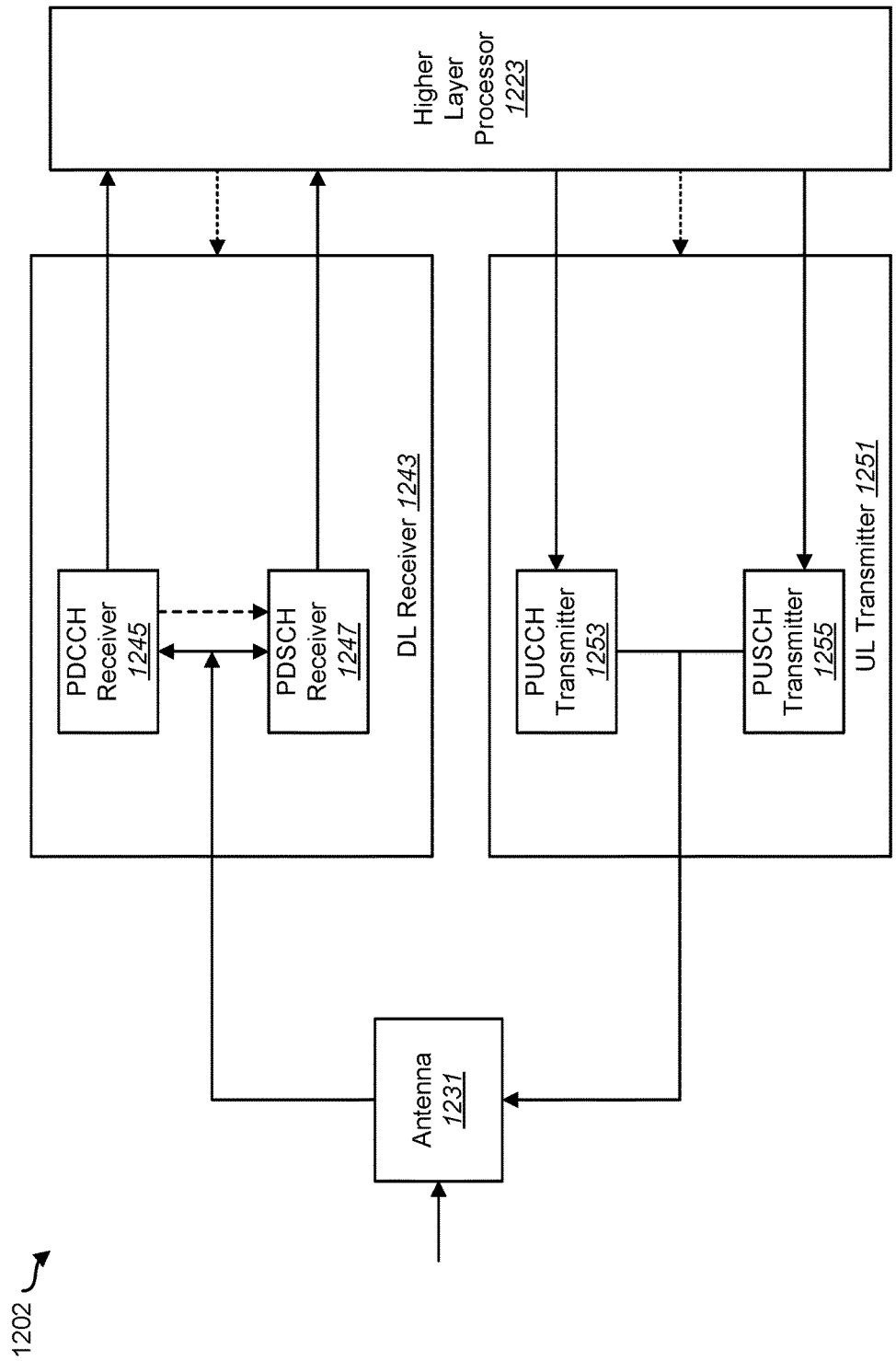
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 Downlink Control Information (DCI). The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 13:
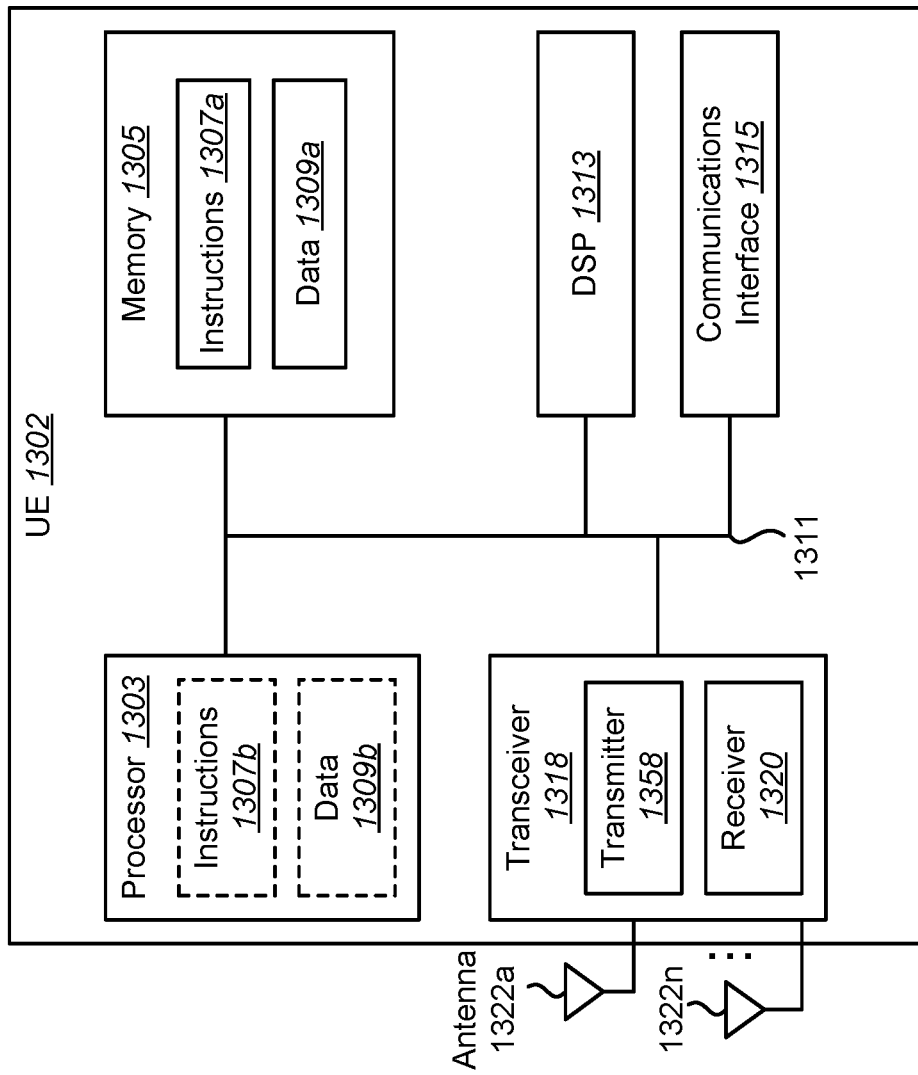
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1303 that controls operation of the UE 1302. The processor 1303 may also be referred to as a central processing unit (CPU). Memory 1305, which may include read-only memory (ROM), random access memory (RAM), a combination of the two or any type of device that may store information, provides instructions 1307*a* and data 1309*a* to the processor 1303. A portion of the memory 1305 may also include non-volatile random access memory (NVRAM). Instructions 1307*b* and data 1309*b* may also reside in the processor 1303. Instructions 1307*b* and/or data 1309*b* loaded into the processor 1303 may also include instructions 1307*a* and/or data 1309*a* from memory 1305 that were loaded for execution or processing by the processor 1303. The instructions 1307*b* may be executed by the processor 1303 to implement the methods described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322*a-n* are attached to the housing and electrically coupled to the transceiver 1318.

The various components of the UE 1302 are coupled together by a bus system 1311, which may include a power bus, a control signal bus and a status signal bus, in addition to a data bus. However, for the sake of clarity, the various buses are illustrated in FIG. 13 as the bus system 1311. The UE 1302 may also include a digital signal processor (DSP) 1313 for use in processing signals. The UE 1302 may also include a communications interface 1315 that provides user access to the functions of the UE 1302. The UE 1302 illustrated in FIG. 13 is a functional block diagram rather than a listing of specific components.

Figure 14:
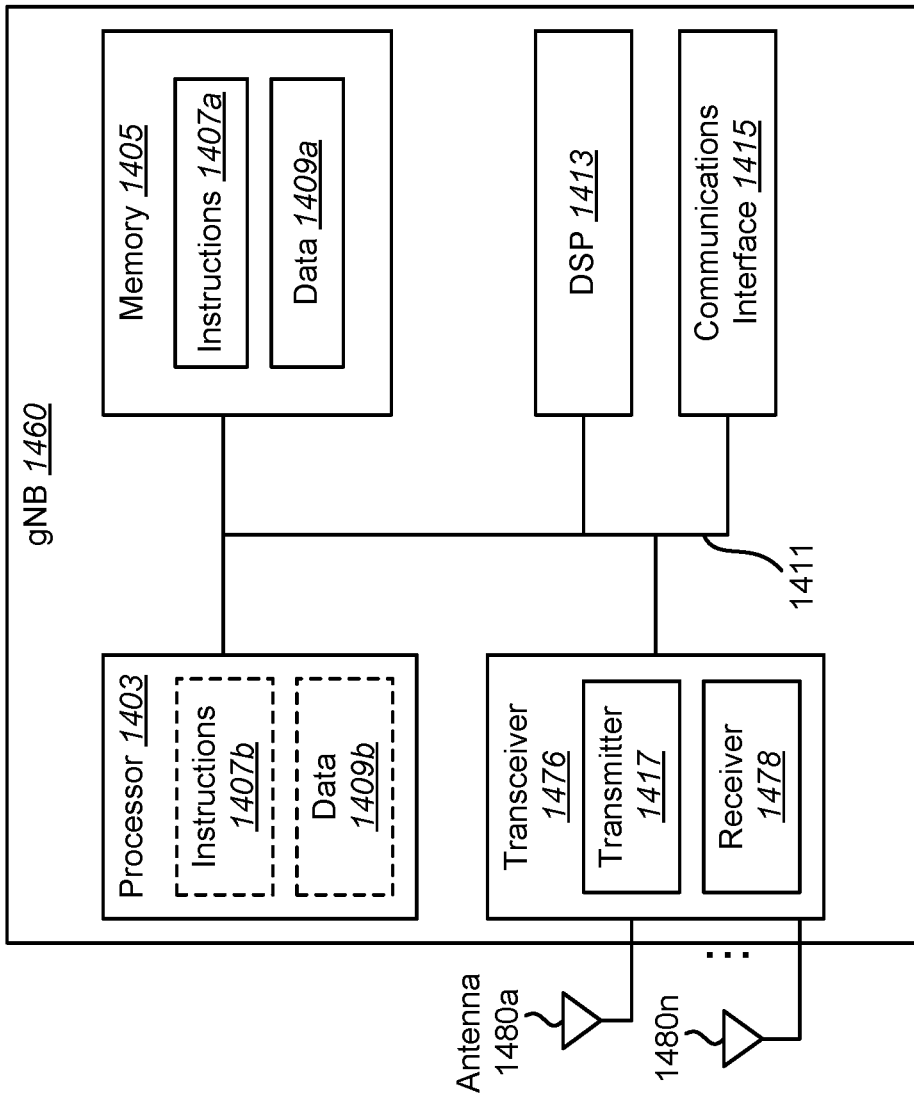
FIG. 14 illustrates various components that may be utilized in a gNB.

FIG. 14 illustrates various components that may be utilized in a gNB 1460. The gNB 1460 described in connection with FIG. 14 may be implemented in accordance with the gNB 160 described in connection with FIG. 1. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407*a* and data 1409*a* to the processor 1403. A portion of the memory 1405 may also include non-volatile random access memory (NVRAM). Instructions 1407*b* and data 1409*b* may also reside in the processor 1403. Instructions 1407*b* and/or data 1409*b* loaded into the processor 1403 may also include instructions 1407*a* and/or data 1409*a* from memory 1405 that were loaded for execution or processing by the processor 1403. The instructions 1407*b* may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480*a-n* are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 14 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 14 is a functional block diagram rather than a listing of specific components.

Figure 15:
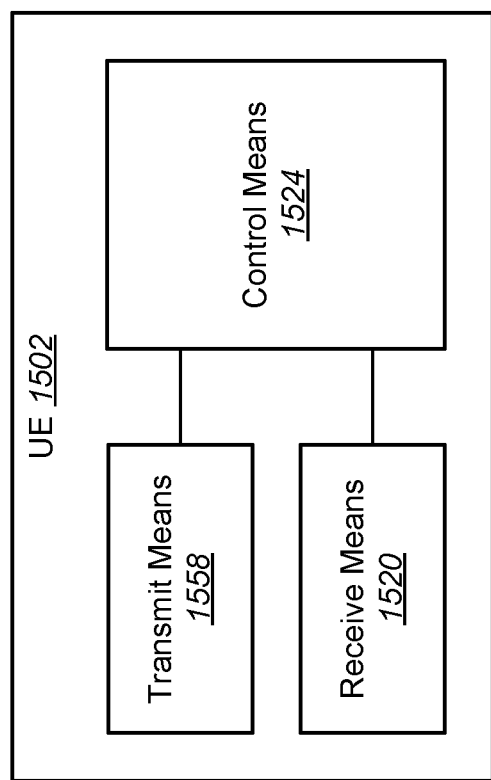
FIG. 15 is a block diagram illustrating one implementation of a UE in which systems and methods for supporting URLLC service in 5G NR may be implemented.

FIG. 15 is a block diagram illustrating one implementation of a UE 1502 in which systems and methods for supporting URLLC service in 5G NR may be implemented. The UE 1502 includes transmit means 1558, receive means 1520 and control means 1524. The transmit means 1558, receive means 1520 and control means 1524 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

Figure 16:
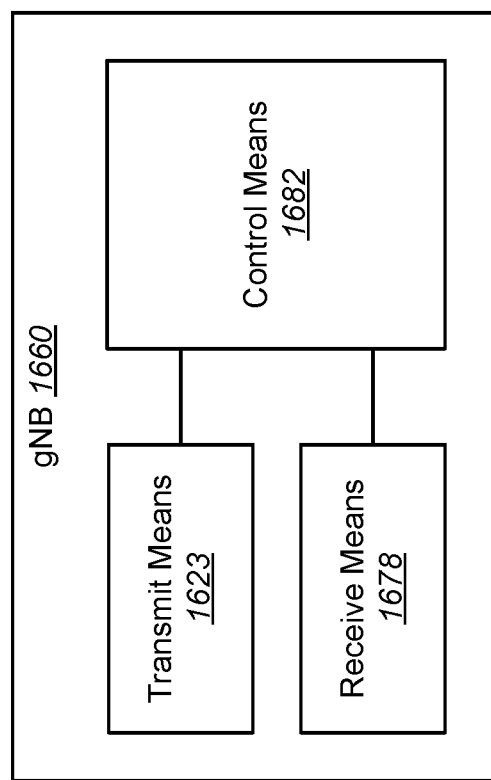
FIG. 16 is a block diagram illustrating one implementation of a gNB in which systems and methods for supporting URLLC service in 5G NR may be implemented.

FIG. 16 is a block diagram illustrating one implementation of a gNB 1660 in which systems and methods for supporting URLLC service in 5G NR may be implemented. The gNB 1660 includes transmit means 1617, receive means 1678 and control means 1682. The transmit means 1617, receive means 1678 and control means 1682 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

Figure 17:
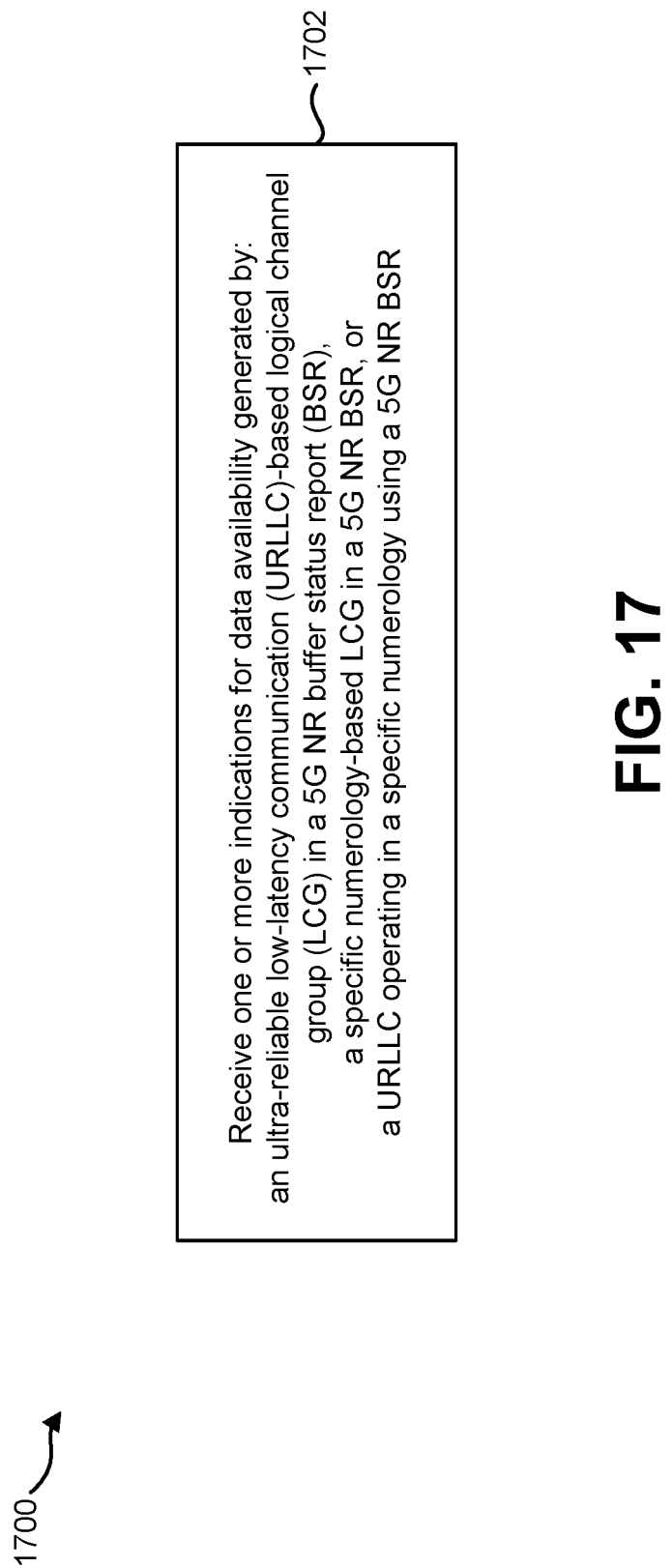
FIG. 17 is a flow diagram illustrating a communication method of a 5G NR gNB.

FIG. 17 is a flow diagram illustrating a communication method 1700 of a 5G new radio (NR) Base Station (gNB) 160. The gNB 160 may receive 1702 one or more indications for data availability generated by an ultra-reliable low-latency communication (URLLC)-based logical channel group (LCG) in a 5G NR buffer status report (BSR), a specific numerology-based LCG in a 5G NR BSR, or a URLLC operating in a specific numerology using a 5G NR BSR.

The gNB 160 may also process a bandwidth request on highest priority. The gNB 160 may allocate enough bandwidth for the bandwidth request. The gNB 160 may preempt any services grants if necessary.

A URLLC flag may be included in a medium access control (MAC) Control Element (CE) using Logical Channel Groups at the beginning or end of the MAC CE to achieve backward compatibility. A URLLC flag may be received in a new MAC Control Element with new logical channel IDs at the beginning or end of the frame.

A URLLC flag may be included in a logical channel configuration information element to indicate attributes of URLLC services. The URLLC flag may be included in the logical channel configuration information element when performing an RRCConnectionRequest message or procedure. The URLLC flag may be included in the logical channel configuration information element when performing an RRCConnectionResumeRequest message or procedure. The URLLC flag may be included in the logical channel configuration information element when performing an RRCConnectionReconfiguration message or procedure. The URLLC flag may be included in the logical channel configuration information element when performing an RRCConnectionReestablishmentRequest message or procedure.

Figure 18:
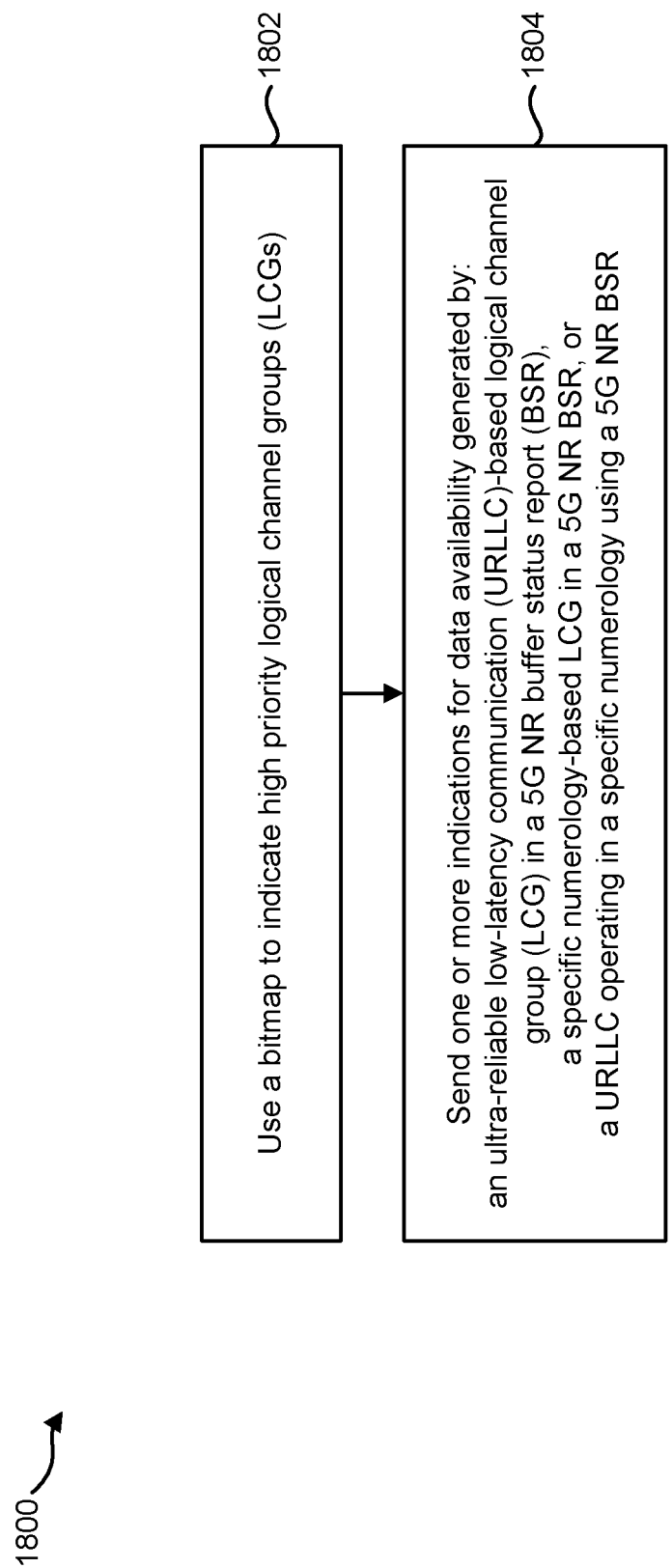
FIG. 18 is a flow diagram illustrating a communication method of a 5G NR UE.

FIG. 18 is a flow diagram illustrating a communication method 1800 of a 5G new radio (NR) user equipment (UE) 102. The UE 102 may use 1802 a bitmap to indicate high priority logical channel groups (LCGs). The UE 102 may send 1804 one or more indications for data availability generated by an ultra-reliable low-latency communication (URLLC)-based logical channel group (LCG) in a 5G NR buffer status report (BSR), a specific numerology-based LCG in a 5G NR BSR, or a URLLC operating in a specific numerology using a 5G NR BSR.

The UE 102 may receive a grant for the URLLC. The UE 102 may send URLLC data from an LCG according to its priority.

The bitmap may be included in a BSR medium access control (MAC) Control Element (CE) to indicate Logical Channel Groups. The bitmap based flag may be sent in a new NR BSR MAC Control Element as logical channel group IDs.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A 5G new radio (NR) Base Station (gNB), comprising:
a processor; and
memory in electronic communication with the processor, wherein instructions stored in the memory are executable to:
assign dedicated resources to a user equipment (UE), wherein the dedicated resources include grant-free resources sized to accommodate only a buffer status report (B SR) size, wherein the grant-free resources allow only buffer status reporting corresponding to elevated priority traffic, and wherein the grant-free resources allow data transfer when there is no pending BSR;
receive a 5G NR BSR triggered based on a number of padding bits, wherein the 5G NR BSR is a grant-free transmission on the grant-free resources without communication of a corresponding scheduling request (SR); and
receive one or more indications for data availability generated by
an ultra-reliable low-latency communication (URLLC) operating in a specific numerology using the 5G NR BSR.

2. The gNB of claim 1, wherein the instructions are further executable to:
process a bandwidth request on highest priority;
allocate enough bandwidth for the bandwidth request; and
pre-empt any services grants if necessary, wherein granting the bandwidth request preempts granting any other pending bandwidth requests if necessary to grant the bandwidth request.

3. The gNB of claim 1, wherein a URLLC flag is included in a medium access control (MAC) Control Element (CE) using Logical Channel Groups at a beginning or end of the MAC CE to achieve backward compatibility.

4. The gNB of claim 1, wherein a URLLC flag is received in a new MAC Control Element with new logical channel IDs at a beginning or end of a frame.

5. The gNB of claim 1, wherein a URLLC flag is included in a logical channel configuration information element to indicate attributes of URLLC services.

6. The gNB of claim 5, wherein the URLLC flag is included in the logical channel configuration information element when performing an RRCConnectionRequest message or procedure.

7. The gNB of claim 5, wherein the URLLC flag is included in the logical channel configuration information element when performing an RRCConnectionResumeRequest message or procedure.

8. The gNB of claim 5, wherein the URLLC flag is included in the logical channel configuration information element when performing an RRCConnectionReconfiguration message or procedure.

9. The gNB of claim 5, wherein the URLLC flag is included in the logical channel configuration information element when performing an RRCConnectionReestablishmentRequest message or procedure.

10. A 5G new radio (NR) user equipment (UE), comprising:
a processor; and
memory in electronic communication with the processor, wherein instructions stored in the memory are executable to:
receive an assignment of dedicated resources to the UE, wherein the dedicated resources include grant-free resources sized to accommodate only a buffer status report (BSR) size, wherein the grant-free resources allow only buffer status reporting corresponding to elevated priority traffic, and wherein the grant-free resources allow data transfer when there is no pending BSR;
trigger a 5G NR BSR based on a number of padding bits, wherein the 5G NR BSR is a grant-free transmission on the grant-free resources without communication of a corresponding scheduling request (SR);
use a bitmap to indicate high priority logical channel groups (LCGs); and
send one or more indications for data availability generated by
an ultra-reliable low-latency communication (URLLC) operating in a specific numerology using the 5G NR BSR.

11. The UE of claim 10, wherein the instructions are further executable to:
receive a grant for the URLLC; and
send URLLC data from an LCG according to its priority.

12. The UE of claim 10, wherein the bitmap is included in a BSR medium access control (MAC) Control Element (CE) to indicate Logical Channel Groups.

13. The UE of claim 10, wherein the bitmap is sent in a new NR BSR MAC Control Element as logical channel group IDs.

14. The UE of claim 10, wherein a URLLC flag is included in a logical channel configuration information element to indicate attributes of URLLC services.

15. The UE of claim 14, wherein the URLLC flag is included in the logical channel configuration information element when performing an RRCConnectionRequest message or procedure.

16. The UE of claim 14, wherein the URLLC flag is added to the logical channel configuration information element when performing an RRCConnectionResumeRequest message or procedure.

17. The UE of claim 14, wherein the URLLC flag is included in the logical channel configuration information element when performing an RRCConnectionReconfiguration message or procedure.

18. The UE of claim 14, wherein the URLLC flag is included in the logical channel configuration information element when performing an RRCConnectionReestablishmentRequest message or procedure.

* * * * *